(12) United States Patent
Lee et al.

(10) Patent No.: US 12,439,054 B2
(45) Date of Patent: *Oct. 7, 2025

(54) IMAGE ENCODING/DECODING METHOD AND DEVICE

(71) Applicant: Dolby International AB, Amsterdam Zuidoost (NL)

(72) Inventors: Bae Keun Lee, Seongnam-si (KR); Dong San Jun, Changwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 12 days.

This patent is subject to a terminal disclaimer.

(21) Appl. No.: 18/476,044

(22) Filed: Sep. 27, 2023

(65) Prior Publication Data

US 2024/0022730 A1    Jan. 18, 2024

Related U.S. Application Data

(63) Continuation of application No. 17/418,540, filed as application No. PCT/KR2019/018644 on Dec. 27, 2019, now Pat. No. 11,812,031.

(30) Foreign Application Priority Data

Dec. 27, 2018  (KR) ........................ 10-2018-0171321

(51) Int. Cl.
*H04N 7/12*        (2006.01)
*H04N 19/139*      (2014.01)
(Continued)

(52) U.S. Cl.
CPC ......... *H04N 19/139* (2014.11); *H04N 19/176* (2014.11); *H04N 19/46* (2014.11); *H04N 19/513* (2014.11)

(58) Field of Classification Search
CPC .... H04N 19/139; H04N 19/176; H04N 19/46; H04N 19/513; H04N 19/70; H04N 19/52;
(Continued)

(56) References Cited

U.S. PATENT DOCUMENTS 10,187,567 B2 *  1/2019  Giger ...................... G01S 17/08
10,735,752 B2 *  8/2020  Kang ................... H04N 19/597
(Continued)

FOREIGN PATENT DOCUMENTS

CN    105706450 A    6/2016
CN    107113424 A    8/2017
(Continued)

OTHER PUBLICATIONS

Office Action for CN 201980086601.X by China National Intellectual Property Administration dated Aug. 25, 2023.
(Continued)

*Primary Examiner* — Gims S Philippe
(74) *Attorney, Agent, or Firm* — BROADVIEW IP LAW, PC

(57) ABSTRACT

The image encoding/decoding method and device according to the present invention can construct a merge candidate list of a current block, derive motion information of the current block on the basis of the merge candidate list and a merge index of the current block, derive a motion vector difference of the current block, correct a motion vector of the current block by means of the motion vector difference, and carry out motion compensation on the current block by means of the corrected motion vector.

6 Claims, 26 Drawing Sheets

(51) Int. Cl.
*H04N 19/176* (2014.01)
*H04N 19/46* (2014.01)
*H04N 19/513* (2014.01)

(58) Field of Classification Search
CPC .. H04N 19/109; H04N 19/117; H04N 19/119; H04N 19/122; H04N 19/51
See application file for complete search history.

(56) References Cited

U.S. PATENT DOCUMENTS

| | | |
|---|---|---|
| 2014/0269916 A1 | 9/2014 | Lim et al. |
| 2014/0355688 A1* | 12/2014 | Lim ................ H04N 19/52 375/240.16 |
| 2017/0078699 A1 | 3/2017 | Park et al. |
| 2018/0249156 A1* | 8/2018 | Heo ................ H04N 19/103 |
| 2018/0316934 A1* | 11/2018 | Nam ................ H04N 19/46 |
| 2019/0246103 A1* | 8/2019 | Jun ................ H04N 19/117 |
| 2020/0280735 A1 | 9/2020 | Lim et al. |
| 2021/0058628 A1* | 2/2021 | Lee ................ H04N 19/176 |

FOREIGN PATENT DOCUMENTS

| | | |
|---|---|---|
| KR | 10-2014-0105038 A | 9/2014 |
| KR | 10-2018-0134764 A | 12/2018 |
| WO | 2015/142057 A1 | 9/2015 |

OTHER PUBLICATIONS

Li, Guichun et al. (2018). "CE4-related: affine merge mode with prediction offsets", Joint Video Experts Team (JVET) of ITU-T SG 16 WP 3 and ISO/IEC JTC 1/SC 29/WG 11. JVET-L0320.

Chen, Kxu et al., "CE 4: Merge Offset Extension (Test 4.4.8)", Joint Video Experts Team (JVET) of ITU-T SG 16 WP 3 and ISO/IEC JTC I/SC 29/WG 11. JVET-L0176, 12th Meeting, Macao, CN. pp. 1-6, Oct. 12, 2018 [Retrieved on Mar. 31, 2020], Retrieved from [http://phenix.int-evry.fr/jvet/], see pp. 1-4.

Yang, Haitao et al., "Description of Core Experiment 4 (CE4): Inter prediction and motion vector coding". Joint Video Experts Team (JVET) of ITU-T SG 16 WP 3 and ISO/IEC JTC 1/SC 29/WG 11, JVET-L1024_v3. 12th Meeting, Macao, CN. pp. 1-15, Oct. 12, 2018, See pp. 5-6.

Samuelsson, Jonatan, "Example restriction flags for VVC", Joint Video Experts Team (JVET) of ITU-TU-T SG 16 WP 3 and ISO/IEC JTC 1/SC 29/WG 11. JVET-L0042. 12th Meeting. Macao, CN. pp. 1-4, Oct. 12, 2018, See pp. 1-4.

International Search Report for PCT/KR2019/018644 dated Apr. 14, 2020.

Written Opinion for PCT/KR2019/018644 dated Apr. 14, 2020.

Office Action for CN 201980086601.X by China National Intellectual Property Administration dated Mar. 6, 2024.

* cited by examiner

Rotation                                   Zoom-in

Zoom-out                                   Affine (a)  (b)

(a)

(b)

IMAGE ENCODING/DECODING METHOD AND DEVICE

CROSS-REFERENCE TO RELATED APPLICATIONS

This application is a Continuation of U.S. application Ser. No. 17/418,540 filed Jun. 25, 2021, which is a National Stage of International Application No. PCT/KR2019/018644 filed Dec. 27, 2019, claiming priority based on Korean Patent Application No. 10-2018-0171321 filed Dec. 27, 2018.

TECHNICAL FIELD

The present disclosure relates to a method and a device for processing a video signal.

BACKGROUND ART

As a market demand for a high-resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding and an in-loop filter. On the other hand, as a demand for a high resolution image has increased, a demand for stereoscopic image contents has increased as a new image service. A video compression technology for effectively providing high resolution and ultra high resolution stereo-scopic image contents has been discussed.

DISCLOSURE

Technical Problem

A purpose of the present disclosure is to provide a method and a device of partitioning a picture adaptively.

A purpose of the present disclosure is to provide an intra prediction method and device.

A purpose of the present disclosure is to provide an inter prediction method and device.

A purpose of the present disclosure is to provide an inter prediction method and device using a merge mode based on a motion vector difference value (MVD).

Technical Solution

An image encoding/decoding method and device according to the present disclosure may configure a merge candidate list of a current block, derive motion information of the current block based on a merge index of the current block and the merge candidate list, derive a motion vector difference value of the current block, modify a motion vector of the current block by using the motion vector difference value and perform motion compensation of the current block by using the modified motion vector.

In an image encoding/decoding method and device according to the present disclosure, the motion information may include at least one of a motion vector or a reference picture index.

In an image encoding/decoding method and device according to the present disclosure, the merge candidate list may include at least one of a spatial merge candidate or a temporal merge candidate of the current block.

In an image encoding/decoding method and device according to the present disclosure, motion information of a previous block belonging to a motion information list of the current block may be further added to the merge candidate list and the previous block may be one or more blocks which are decoded before the current block.

In an image encoding/decoding method and device according to the present disclosure, deriving the motion vector difference value may be selectively performed based on a predetermined flag and the flag may represent whether a motion vector difference value is used in a merge mode.

In an image encoding/decoding method and device according to the present disclosure, the maximum number of merge candidates available for the current block may be adaptively determined according to the flag.

In an image encoding/decoding method and device according to the present disclosure, the motion vector difference value may be derived based on a merge offset vector and the merge offset vector may be determined based on a length and a direction of the merge offset vector.

In an image encoding/decoding method and device according to the present disclosure, a length of the merge offset vector may be determined by considering at least one of an encoded distance index or precision of a motion vector of the current block.

In an image encoding/decoding method and device according to the present disclosure, a direction of the merge offset vector may be determined based on an encoded direction index and the direction may be determined as any one of a left, right, top or bottom direction.

In an image encoding/decoding method and device according to the present disclosure, the motion vector difference value may be derived by applying a predetermined scaling factor to the merge offset vector and the scaling factor may be determined based on a POC difference between a current picture to which the current block belongs and a reference picture of the current block.

A digital storage media for storing a video stream according to the present disclosure may record/store a video decoding program which configures a merge candidate list of a current block, derives motion information of the current block based on a merge index of the current block and the merge candidate list, derives a motion vector difference value of the current block, modifies a motion vector of the current block by using the motion vector difference value and performs motion compensation of the current block by using the modified motion vector.

Technical Effects

The present disclosure may improve encoding/decoding efficiency of a video signal by partitioning a picture in a predetermined unit and performing encoding/decoding.

The present disclosure may improve encoding efficiency of intra prediction by using a subdivided directional mode and/or a selective pixel line.

The present disclosure may improve encoding efficiency of inter prediction by using an affine mode or inter region motion information.

The present disclosure may improve encoding efficiency and accuracy of a motion vector by using a merge mode based on a motion vector difference value (MVD).

DESCRIPTION OF DIAGRAMS

BEST MODE

Figure 1:
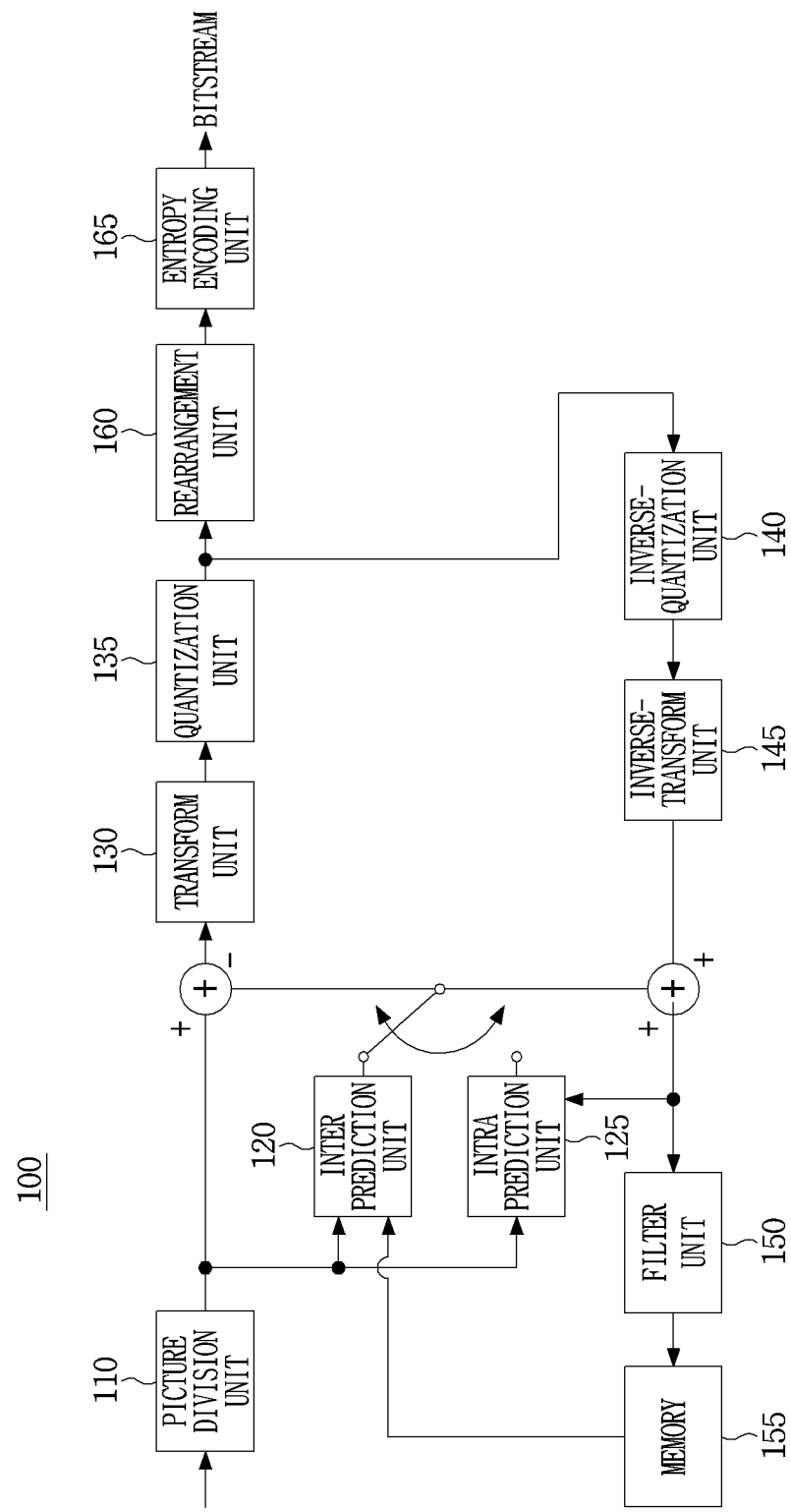
FIG. 1 is a block diagram showing an image encoding device according to the present disclosure.

An image encoding/decoding method and device according to the present disclosure may configure a merge candidate list of a current block, derive motion information of the current block based on a merge index of the current block and the merge candidate list, derive a motion vector difference value of the current block, modify a motion vector of the current block by using the motion vector difference value and perform motion compensation of the current block by using the modified motion vector.

In an image encoding/decoding method and device according to the present disclosure, the motion information may include at least one of a motion vector or a reference picture index.

In an image encoding/decoding method and device according to the present disclosure, the merge candidate list may include at least one of a spatial merge candidate or a temporal merge candidate of the current block.

In an image encoding/decoding method and device according to the present disclosure, motion information of a previous block belonging to a motion information list of the current block may be further added to the merge candidate list and the previous block may be one or more blocks which are decoded before the current block.

In an image encoding/decoding method and device according to the present disclosure, deriving the motion vector difference value may be selectively performed based on a predetermined flag and the flag may represent whether a motion vector difference value is used in a merge mode.

In an image encoding/decoding method and device according to the present disclosure, the maximum number of merge candidates available for the current block may be adaptively determined according to the flag.

In an image encoding/decoding method and device according to the present disclosure, the motion vector difference value may be derived based on a merge offset vector and the merge offset vector may be determined based on a length and a direction of the merge offset vector.

In an image encoding/decoding method and device according to the present disclosure, a length of the merge offset vector may be determined by considering at least one of an encoded distance index or precision of a motion vector of the current block.

In an image encoding/decoding method and device according to the present disclosure, a direction of the merge offset vector may be determined based on an encoded direction index and the direction may be determined as any one of a left, right, top or bottom direction.

In an image encoding/decoding method and device according to the present disclosure, the motion vector difference value may be derived by applying a predetermined scaling factor to the merge offset vector and the scaling factor may be determined based on a POC difference between a current picture to which the current block belongs and a reference picture of the current block.

A digital storage media for storing a video stream according to the present disclosure may record/store a video decoding program which configures a merge candidate list of a current block, derives motion information of the current block based on a merge index of the current block and the merge candidate list, derives a motion vector difference value of the current block, modifies a motion vector of the current block by using the motion vector difference value and performs motion compensation of the current block by using the modified motion vector.

MODE FOR INVENTION

Referring to a diagram attached in this description, an embodiment of the present disclosure is described in detail so that a person with ordinary skill in the art to which the inventions pertain may easily carry it out. But, the present disclosure may be implemented in a variety of different shapes and is not limited to an embodiment which is described herein. And, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, the order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in separate hardware or one software construction unit. In other words, each construction unit may be described by being enumerated as each construction unit for convenience of description, at least two construction units among each construction unit may be combined to configure one construction unit or one construction unit may be divided into a plurality of construction units to perform a function. Such an integrated embodiment and separated embodiment in each construction unit are also included in a scope of a right on the present disclosure as long as they are not beyond the essence of the present disclosure.

In this description, a block may be variously represented as a unit, a region, a unit, a partition, etc. and a sample may be variously represented as a pixel, a pel, a pixel, etc.

Hereinafter, referring to the attached diagrams, an embodiment of the present disclosure will be described in more detail. In describing the present disclosure, overlapping description for the same component is omitted.

FIG. 1 is a block diagram showing an image encoding device according to the present disclosure.

In reference to FIG. 1, a traditional image encoding device 100 may include a picture partition unit 110, a prediction unit 120, 125, a transform unit 130, a quantization unit 135, a rearrangement unit 160, an entropy encoding unit 165, a dequantization unit 140, an inverse transform unit 145, a filter unit 150 and a memory 155.

A picture partition unit 110 may partition an input picture into at least one processing unit. In this case, a processing unit may be a prediction unit (PU), a transform unit (TU) or a coding unit (CU). Hereinafter, in an embodiment of the present disclosure, a coding unit may be used as a unit performing encoding and may be used as a unit performing decoding.

A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N.

A prediction unit 120 and 125 may include an inter prediction unit 120 performing inter prediction and an intra prediction unit 125 performing intra prediction. Whether to perform inter prediction or intra prediction for a prediction unit may be determined and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder.

An inter prediction unit 120 may predict a prediction unit based on information of at least one picture of a previous picture or a subsequent picture of a current picture or may predict a prediction unit based on information of some regions which are encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information equal to or less than an integer pixel may be generated in a reference picture. For a luma pixel, a DCT-based 8-tap interpolation filter with a different filter coefficient may be used to generate pixel information equal to or less than an integer pixel in a ¼ pixel unit. For a chroma signal, a DCT-based 4-tap interpolation filter with a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip mode, a merge mode, a AMVP (Advanced Motion Vector Prediction) mode, an intra block copy mode, an affine mode, etc. may be used.

An intra prediction unit 125 may generate a prediction unit based on reference pixel information around a current block, pixel information in a current picture. When a reference pixel is a pixel which performed inter prediction because a surrounding block in a current prediction unit is a block which performed inter prediction, a reference pixel included in a block which performed inter prediction may be used by being substituted with reference pixel information of a block which performed surrounding intra prediction. In other words, when a reference pixel is unavailable, unavailable reference pixel information may be used by being substituted with at least one reference pixel of available reference pixels.

In addition, a residual block including residual value information, a difference value between a prediction unit which performed prediction based on a prediction unit generated in a prediction unit 120 and 125 and an original block in a prediction unit, may be generated. A generated residual block may be input into a transform unit 130.

In a transform unit 130, an original block and a residual block including residual value information in a prediction unit generated in a prediction unit 120 and 125 may be transformed by using a transform method such as DCT (Discrete Cosine Transform), DST (Discrete Sine Transform), KLT. Whether to apply DCT, DST or KLT to transform a residual block may be determined based on intra prediction mode information in a prediction unit used to generate a residual block.

A quantization unit 135 may quantize values which are transformed into a frequency domain in a transform unit 130. According to a block or according to image importance, a quantized coefficient may be changed. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a two-dimensional block-shaped coefficient into a one-dimensional vector shape through a coefficient scanning method. For example, in a rearrangement unit 160, a DC coefficient to a coefficient in a high frequency domain may be scanned by a zig-zag scanning method and may be changed into a one-dimensional vector shape. A vertical scan which scans a two-dimensional block-shaped coefficient by column or a horizontal scan which scans a two-dimensional block-shaped coefficient by row may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various encoding methods such as Exponential Golomb, CAVLC(Context-Adaptive Variable Length Coding), CABAC(Context-Adaptive Binary Arithmetic Coding). Regarding it, an entropy encoding unit 165 may encode residual value coefficient information in a coding unit from a rearrangement unit 160 and a prediction unit 120, 125. In addition, according to the present disclosure, it is possible to signal and transmit information indicating that motion information is derived in terms of a decoder and used and information on a method used for deriving motion information.

In a dequantization unit 140 and an inverse transform unit 145, values quantized in a quantization unit 135 are dequantized and values transformed in a transform unit 130 are inversely transformed. A residual value generated in a dequantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit and ALF (Adaptive Loop Filter). A deblocking filter may remove block distortion generated by a boundary between blocks in a reconstructed picture. An offset modification unit may modify an offset with an original image in a pixel unit for an image performing deblocking. A method in which a pixel included in an image is divided into the certain number of regions, a region which will perform an offset is determined and an offset is applied to the corresponding region or a method in which an offset is applied by considering edge information of each pixel may be used to perform offset modification for a specific picture. ALF (Adaptive Loop Filter) may be performed based on a value comparing a filtered reconstructed image with an original image. A pixel included in an image may be divided into a predetermined group, one filter which will be applied to the corresponding group may be determined and filtering may be performed discriminately per group.

A memory 155 may store a reconstructed block or picture calculated in a filter unit 150 and a stored reconstructed block or picture may be provided for a prediction unit 120 and 125 when inter prediction is performed.

Figure 2:
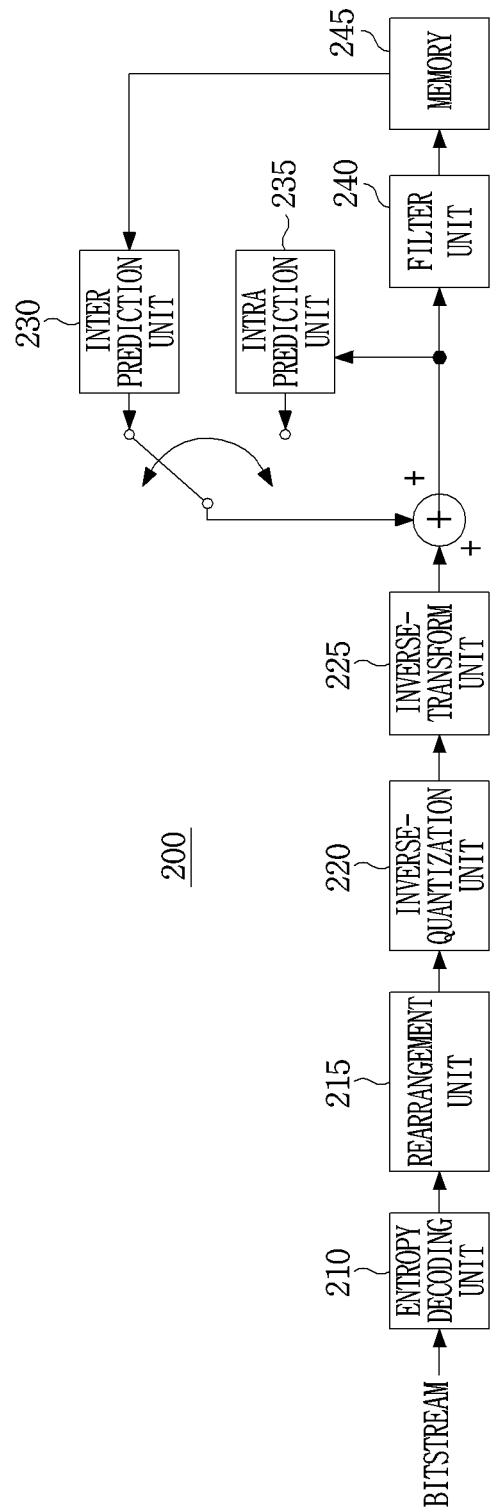
FIG. 2 is a block diagram showing an image decoding device according to the present disclosure.

FIG. 2 is a block diagram showing an image decoding device according to the present disclosure.

In reference to FIG. 2, an image decoder 200 may include an entropy decoding unit 210, a rearrangement unit 215, a dequantization unit 220, an inverse transform unit 225, a prediction unit 230 and 235, a filter unit 240 and a memory 245.

When an image bitstream is input in an image encoder, an input bitstream may be decoded in a process opposite to that of an image encoder.

An entropy decoding unit 210 may perform entropy decoding in a process opposite to a process in which entropy encoding is performed in an entropy encoding unit of an image encoder. For example, in response to a method performed in an image encoder, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210 based on a rearrangement method of an encoding unit. Coefficients represented in a one-dimensional vector shape may be reconstructed into coefficients in a two-dimensional block shape and may be rearranged.

A dequantization unit 220 may perform dequantization based on a quantization parameter provided in an encoder and a coefficient value of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as operation in an image encoder, intra prediction for a prediction unit may be performed based on a pixel at a left position of a prediction unit, a pixel at a top-left position and a pixel at a top position, but when a size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction. On the other hand, if information indicating that motion information is derived in terms of a decoder and used and information on a method used for deriving motion information are transmitted in an encoding device 100 without transmitting motion prediction-related information for the inter prediction, the prediction unit determination unit determines whether an inter prediction unit 230 performs prediction based on information transmitted from an encoding device 100.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode, an intra block copy mode, or an affine mode may be determined.

An intra prediction unit 235 may generate a prediction block based on pixel information in a current picture. When a prediction unit is a prediction unit which performs intra prediction, intra prediction may be performed based on intra prediction mode information in a prediction unit provided by an image encoder.

An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode in a current prediction unit. AIS filtering may be performed for a reference pixel of a current block by using a prediction mode in a prediction unit and AIS filter information provided by an image encoder. When a prediction mode of a current block is a mode where AIS filtering is not performed, an AIS filter may not be applied.

When a prediction mode in a prediction unit is a prediction unit in which intra prediction is performed based on a pixel value interpolating a reference pixel, a reference pixel interpolation unit may interpolate a reference pixel to generate a reference pixel in a pixel unit which is equal to or smaller than an integer value. When a prediction mode in a current prediction unit is a prediction mode which generates a prediction block without interpolating a reference pixel, a reference pixel may not be interpolated. ADC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoder. A deblocking filter of an image decoder may receive information related to a deblocking filter provided by an image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

Figure 3:
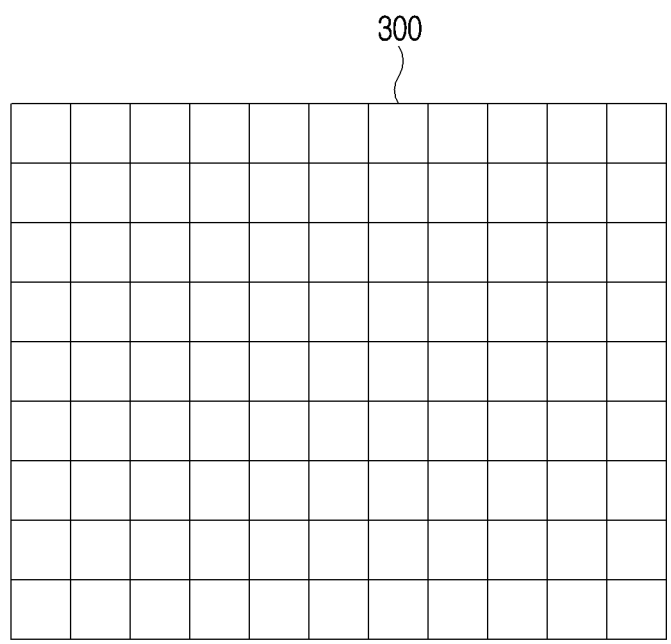
FIGS. 3 to 5 show a method in which a picture is partitioned into a plurality of blocks as an embodiment to which the present disclosure is applied.
Figure 4:
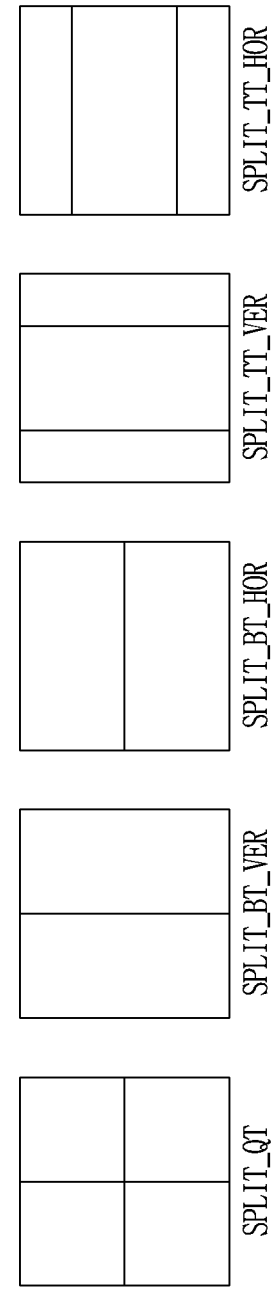
Figure 5:
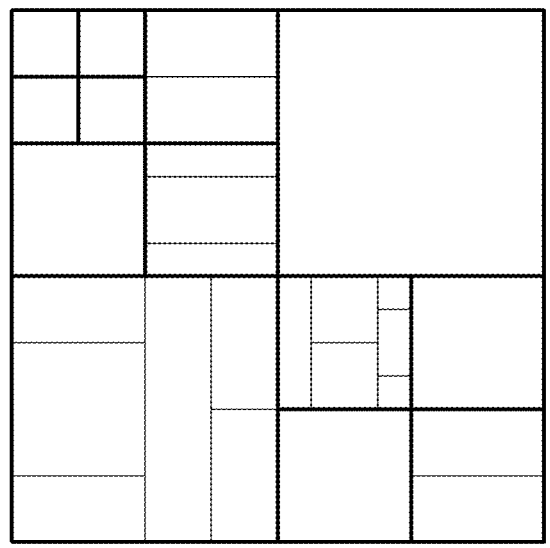

FIGS. 3 to 5 show a method of partitioning a picture into a plurality of blocks as an embodiment to which the present disclosure is applied.

In reference to FIG. 3, a picture 300 is partitioned into a plurality of base coding units (Coding Tree Unit, hereinafter, CTU).

A size of CTU may be specified in a unit of a picture or a video sequence and each CTU is configured not to be overlapped with other CTU. For example, a CTU size may be set as 128×128 in the whole sequences and any one of 128×128 to 256×256 may be selected in a unit of a picture and used.

A coding block/a coding unit (hereinafter, CU) may be generated by hierarchically partitioning CTU. Prediction and transform may be performed in a unit of a coding unit and it becomes a base unit which determines a prediction encoding mode. A prediction encoding mode may represent a method of generating a prediction image and consider intra prediction, inter prediction or combined prediction, etc. as an example. Concretely, for example, a prediction block may be generated by using a prediction encoding mode of at least any one of intra prediction, inter prediction or combined prediction in a unit of a coding unit. When a reference picture indicates a current picture in an inter prediction mode, a prediction block may be generated based on a region in a current picture which has been already encoded. It may be included in inter prediction because a prediction block is generated by using a reference picture index and a motion vector. Intra prediction is a method in which a prediction block is generated by using information of a current picture, inter prediction is a method in which a prediction block is generated by using information of other picture which has been already decoded and combined prediction is a method in which inter prediction and intra prediction are combined and used. Combined prediction may encode/decode some regions of a plurality of sub-regions configuring one coding block with inter prediction and may encode/decode other regions with intra prediction. Alternatively, combined prediction may primarily perform inter prediction for a plurality of sub-regions and secondarily perform intra prediction. In this case, a prediction value of a coding block may be derived by performing a weighted average for a prediction value according to inter prediction and a prediction value according to intra prediction. The number of sub-regions configuring one coding block may be 2, 3, 4, or more and a shape of a sub-region may be a quadrangle, a triangle or other polygon.

In reference to FIG. 4, CTU may be partitioned in a shape of quad tree, binary tree or triple tree. A partitioned block may be additionally partitioned in a shape of quad tree, binary tree or triple tree. A method in which a current block is partitioned into 4 square partitions is referred to as quad tree partitioning, a method in which a current block is partitioned into 2 square or non-square partitions is referred to as binary tree partitioning and a method in which a current block is partitioned into 3 partitions is defined as binary tree partitioning.

Binary partitioning in a vertical direction (SPLIT_BT_VER in FIG. 4) is referred to as vertical binary tree partitioning and binary tree partitioning in a horizontal direction (SPLIT_BT_HOR in FIG. 4) is defined as horizontal binary tree partitioning.

Triple partitioning in a vertical direction (SPLIT_TT_VER in FIG. 4) is referred to as vertical triple tree partitioning and triple tree partitioning in a horizontal direction (SPLIT_TT_HOR in FIG. 4) is defined as horizontal triple tree partitioning.

The number of partitions may be referred to as a partitioning depth and the maximum value of a partitioning depth may be differently set per sequence, picture, sub-picture, slice or tile and it may be set to have a different partitioning depth according to a partitioning tree shape (quad tree/ binary tree/triple tree) and a syntax representing it may be signaled.

As a method such as quad tree partitioning, binary tree partitioning or other multi-tree partitioning (e.g., ternay tree partitioning), a coding unit of a leaf node may be configured by additionally partitioning a partitioned coding unit or without additional partitioning.

In reference to FIG. 5, a coding unit may be set by hierarchically partitioning one CTU and a coding unit may be partitioned by using at least any one of binary tree partitioning, quad tree partitioning/triple tree partitioning. Such a method is referred to as multi tree partitioning.

A coding unit generated by partitioning an arbitrary coding unit whose partitioning depth is k is referred to as a lower coding unit and a partitioning depth is (k+1). A coding unit with a partitioning depth of k which includes a lower coding unit whose partitioning depth is (k+1) is referred to as a higher coding unit.

A partitioning type of a current coding unit may be limited according to a partitioning type of a higher coding unit and/or a partitioning type of a coding unit around a current coding unit.

In this case, a partitioning type represents an indicator which indicates which partitioning of binary tree partitioning, quad tree partitioning/triple tree partitioning is used.

A prediction image may be generated by a plurality of methods in encoding/decoding a video and a method of generating a prediction image is referred to as a prediction encoding mode.

A prediction encoding mode may be configured with an intra prediction encoding mode, an inter prediction encoding mode, a current picture reference encoding mode or a combined encoding mode (combined prediction), etc.

An inter prediction encoding mode is referred to as a prediction encoding mode which generates a prediction block (a prediction image) of a current block by using information of a previous picture and an intra prediction encoding mode is referred to as a prediction encoding mode which generates a prediction block by using a sample neighboring a current block. A prediction block may be generated by using a pre-reconstructed image of a current picture, which is referred to as a current picture reference mode or an intra block copy mode.

A prediction block may be generated by using at least 2 or more prediction encoding modes of an inter prediction encoding mode, an intra prediction encoding mode or a current picture reference encoding mode, which is referred to as a combined encoding mode (combined prediction).

A method in which a prediction block (a prediction image) of a block in a current picture is generated by using information of a previous picture is referred to as an inter prediction encoding mode.

For example, a prediction image may be generated based on a corresponding block (a colocated block) of a previous picture or a prediction block (a prediction image) may be generated based on a specific block of a previous picture.

A block which subtracts a corresponding block of a previous picture from a current block is referred to as a corresponding prediction block (colocated prediction block).

A prediction block may be generated by considering a motion of an object in an inter prediction encoding mode.

For example, if knowing in which direction and how much an object in a previous picture moves, a prediction block (a prediction image) may be generated by subtracting a block considering a motion from a current block, which is referred to as a motion prediction block.

A residual block may be generated by subtracting a motion prediction block or a corresponding prediction block from a current block.

When a motion is generated in an object, energy of a residual block decreases if a motion prediction block rather than the corresponding prediction block is used, so compression performance may be improved.

As such, a method of using a motion prediction block is referred to as motion compensation prediction and motion compensation prediction is used for most inter prediction encoding.

A value representing in which direction and how much an object in a previous picture moves is referred to as a motion vector. A motion vector may use a motion vector with different pixel precision in a unit of a sequence, a picture, a sub-picture, a slice, a tile, a CTU or a CU. For example, pixel precision of a motion vector in a specific block may be at least any one of 1/16, 1/8, 1/4, 1/2, 1, 2, 4 or 8. A type and/or number of available pixel precision candidates may be different per inter prediction encoding mode which is described after. For example, for an affine inter prediction method, k pixel precisions are available and for an inter prediction method using a translation motion, i pixel precisions are available. For a current picture reference mode, j pixel precisions are available. In this case, k, i and j may be a natural number such as 1, 2, 3, 4, 5, or more. But, k may be smaller than i and i may be smaller than j. An affine inter prediction method may use at least one pixel precision of 1/16, 1/4 or 1 and an inter prediction method using a translation motion (e.g., a merge mode, an AMVP mode) may use at least one pixel precision of 1/4, 1/2, 1 or 4. A current picture reference mode may use at least one pixel precision of 1, 4, or 8.

For an inter prediction mode, an inter prediction method using a translation motion and an affine inter prediction method using an affine motion may be selectively used.

Figure 6:
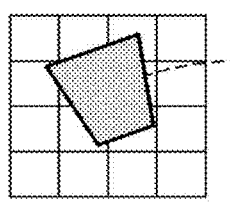
FIGS. 6 to 8 show an affine inter prediction method as an embodiment to which the present disclosure is applied.
Figure 6:
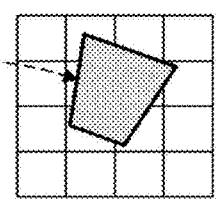
Figure 6:
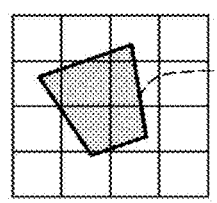
Figure 6:
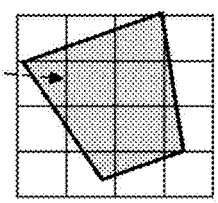
Figure 6:
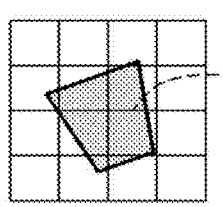
Figure 6:
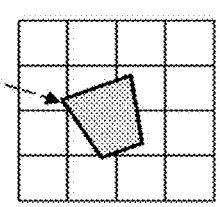
Figure 6:
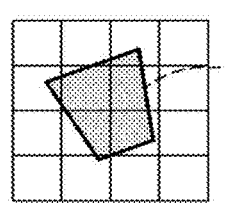
Figure 6:
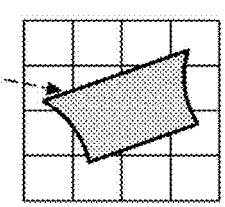
Figure 7:
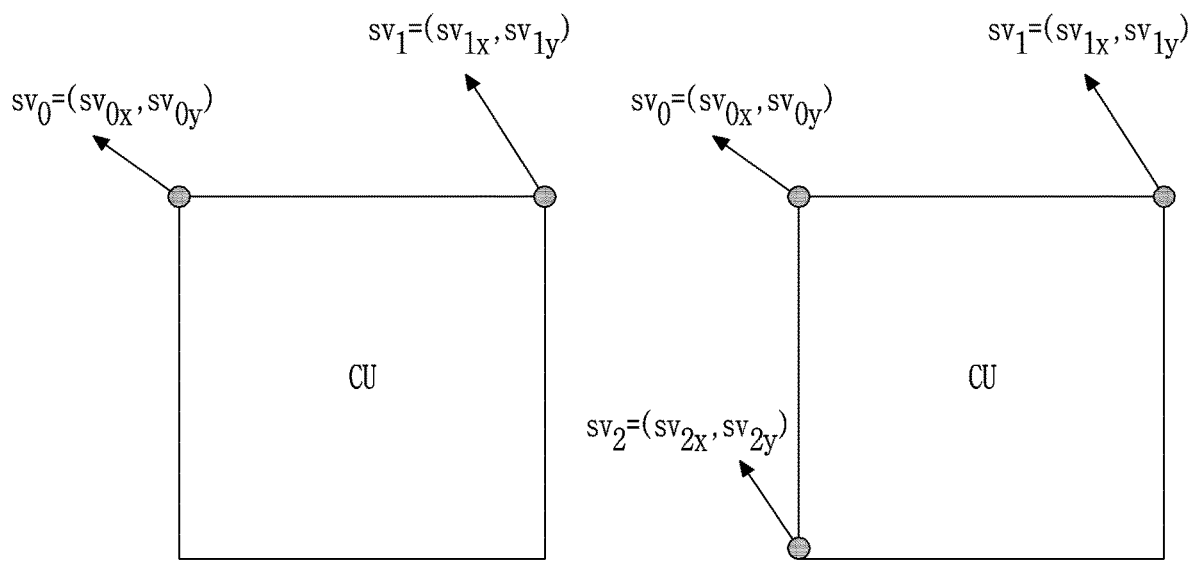
Figure 8:
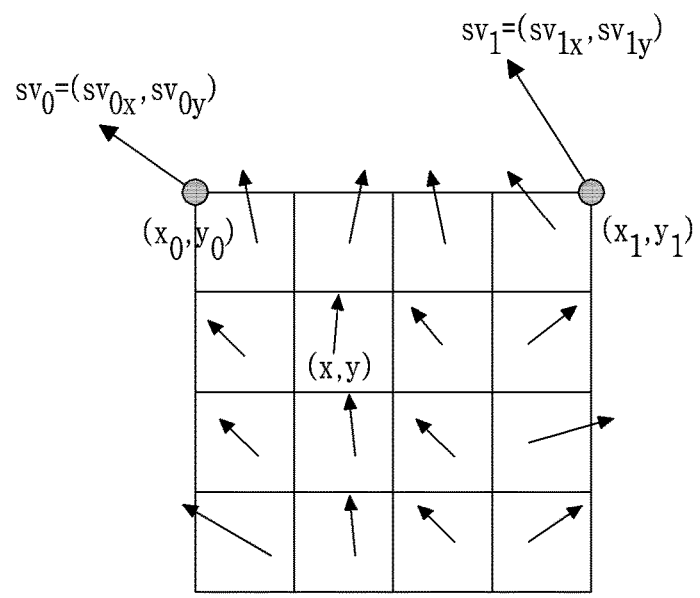

FIGS. 6 to 8 show an affine inter prediction method as an embodiment to which the present disclosure is applied.

In a video, a lot of cases occur in which a motion of a specific object does not appear linearly. For example, as in FIG. 6, when only a translation motion vector is used for a motion of an object in an image that an affine motion such as zoom-in, zoom-out, rotation, affine transform which makes transform in an arbitrary shape possible, etc. is used, a motion of an object may not be effectively represented and encoding performance may be reduced.

An affine motion may be represented as in the following Equation 1.

$$v_x = ax - by + e$$

$$v_y = cx + dy + f \quad \text{[Equation 1]}$$

When an affine motion is represented by using a total of 6 parameters, it is effective for an image with a complex motion, but lots of bits are used to encode an affine motion parameter, so encoding efficiency may be reduced.

Therefore, an affine motion may be simplified and represented with 4 parameters, which is referred to as a 4-parameter affine motion model. Equation 2 represents an affine motion with 4 parameters.

$$v_x = ax - by + e$$

$$v_y = bx + ay + f \quad \text{[Equation 2]}$$

A 4-parameter affine motion model may include motion vectors at 2 control points of a current block. A control point may include at least one of a top-left corner, a top-right corner or a bottom-left corner of a current block. In an example, a 4-parameter affine motion model may be determined by a motion vector sv0 at a top-left sample (x0, y0) of a coding unit and a motion vector sv1 at a top-right sample (x1, y1) of a coding unit as in the left picture of FIG. 7 and $sv_0$ and $sv_1$ are referred to as an affine seed vector. Hereinafter, it is assumed that an affine seed vector $sv_0$ at a top-left position is a first affine seed vector and an affine seed vector $sv_1$ at a top-right position is a second affine seed vector. It is also possible to replace one of a first or second seed vector with an affine seed vector at a bottom-left position and use it in a 4-parameter affine motion model.

A 6-parameter affine motion model is an affine motion model that a motion vector $sv_2$ of a residual control point (e.g., a sample at a bottom-left position (x2, y2)) is added to a 4-parameter affine motion model as in the right picture of FIG. 7. Hereinafter, it is assumed that an affine seed vector $sv_0$ at a top-left position is a first affine seed vector, an affine seed vector $sv_1$ at a top-right position is a second affine seed vector and an affine seed vector $sv_2$ at a bottom-left position is a third affine seed vector.

Information on the number of parameters for representing an affine motion may be encoded in a bitstream. For example, a flag representing whether a 6-parameter is used and a flag representing whether a 4-parameter is used may be encoded/decoded in a unit of at least one of a picture, a sub-picture, a slice, a tile set, a tile, a coding unit or a CTU. Accordingly, any one of a 4-parameter affine motion model or a 6-parameter affine motion model may be selectively used in a predetermined unit.

A motion vector may be derived per sub-block of a coding unit by using an affine seed vector as in FIG. 8, which is referred to as an affine sub-block vector.

An affine sub-block vector may be derived as in the following Equation 3. In this case, a base sample position of a sub-block (x, y) may be a sample positioned at a corner of a block (e.g., a top-left sample) or may be a sample that at least one of a x-axis or a y-axis is at the center (e.g., a central sample).

$$\begin{cases} v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x} \\ v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y} \end{cases}$$ [Equation 3]

Motion compensation may be performed in a unit of a coding unit or in a unit of a sub-block in a coding unit by using an affine sub-block vector, which is referred to as an affine inter prediction mode. In Equation 3, $(x_1-x_0)$ may have the same value as a width of a coding unit.

Figure 9:
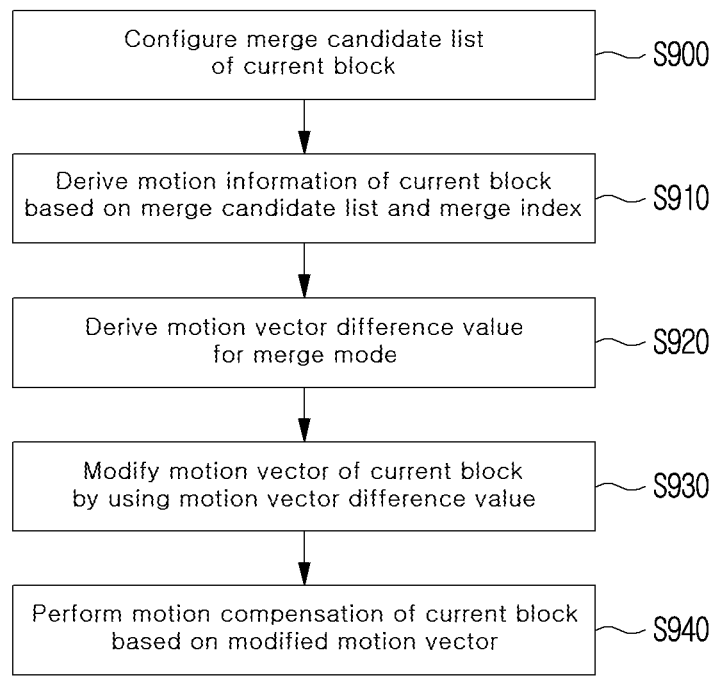
FIG. 9 shows an image encoding/decoding method using a merge mode based on a motion vector difference value (MVD) as an embodiment to which the present disclosure is applied.

FIG. 9 shows an image encoding/decoding method using a merge mode based on a motion vector difference value (MVD) as an embodiment to which the present disclosure is applied.

Motion information of a current coding unit may be derived from motion information of a surrounding block without encoding motion information of a current coding unit (or a current block). Motion information of any one of surrounding blocks may be set as motion information of a current coding unit, which is referred to as a merge mode. In other words, a merge mode uses motion information of a surrounding block as motion information of a current block in the same way and does not require encoding of a separate motion vector difference value unlike an AMVP mode. But, a predetermined motion vector difference value (MVD) may be used to improve accuracy of a motion vector even in a merge mode. In the present disclosure, motion information may be understood to include at least one of a motion vector, a reference picture index or prediction direction information.

The MVD may be selectively used based on a predetermined flag (hereinafter, MVD_flag). MVD_flag may represent whether a motion vector difference value (MVD) is used in a merge mode. For example, when the flag is a first value, a motion vector difference value is used in a merge mode and otherwise, a motion vector difference value is not used in a merge mode.

In reference to FIG. 9, a merge candidate list of a current block may be configured S900.

A merge candidate list may include one or a plurality of merge candidates which may be used to derive motion information of a current block. A size of a merge candidate list may be variably determined based on information indicating the maximum number of merge candidates configuring a merge candidate list (hereinafter, size information). The size information may be encoded in an encoding device and signaled or may be a fixed value (e.g., an integer such as 2, 3, 4, 5, 6 or more) which is pre-promised in a decoding device.

A plurality of merge candidates belonging to a merge candidate list may include at least one of a spatial merge candidate or a temporal merge candidate.

A spatial merge candidate may mean a surrounding block which is spatially adjacent to a current block or motion information of the surrounding block. In this case, a surrounding block may include at least one of a bottom-left block(A0), a left block(A1), a top-right block(B0), a top block(B1) or a top-left block(B2) of a current block. According to a predetermined priority, an available surrounding block among the surrounding blocks may be sequentially added to a merge candidate list. For example, a priority may be defined as B1→A1→B0→A1→B2, A1→B1→A0→B1→B2, A1→B1→B0→A0→B2, etc., but it is not limited thereto.

A temporal merge candidate may mean one or more co-located blocks belonging to a co-located picture or motion information of the co-located block. In this case, a co-located picture is any one of a plurality of reference pictures belonging to a reference picture list, which may be a picture different from a picture to which a current block belongs. A co-located picture may be a picture which is positioned first or may be a picture which is positioned last in a reference picture list. Alternatively, a co-located picture may be specified based on an index encoded to indicate a co-located picture. A co-located block may include at least one of a block(C1) including a central position of a current block or a surrounding block(C0) adjacent to a bottom-right corner of a current block. According to a predetermined priority, an available block of the C0 and C1 may be sequentially added to a merge candidate list. For example, C0 may have a higher priority than C1. But, it is not limited thereto and C1 may have a higher priority than C0.

An encoding/decoding device may include a buffer which stores motion information of one or more blocks which is encoded/decoded before a current block (hereinafter, a previous block). In other words, a buffer may store a list configured with motion information of a previous block (hereinafter, a motion information list).

The motion information list may be initialized in a unit of any one of a picture, a slice, a tile, a CTU row or a CTU.

Initialization may mean a state that a motion information list is empty. Motion information of a previous block may be sequentially added to a motion information list according to an encoding/decoding order of a previous block, but a motion information list may be updated through a method of FIFO (first-in first-out) by considering a size of a motion information list. For example, when motion information which is most recently encoded/decoded (hereinafter, recent motion information) is the same as motion information which is pre-added to a motion information list, recent motion information may not be added to a motion information list. Alternatively, the same motion information as recent motion information may be removed from a motion information list and recent motion information may be added to a motion information list. In this case, recent motion information may be added to the last position of a motion information list or may be added to a position of removed motion information.

A previous block may include at least one of one or more surrounding blocks which are spatially adjacent to a current block or one or more surrounding blocks which are not spatially adjacent to a current block. A range of a previous block of the present disclosure will be described in detail by referring to FIGS. 10 to 14.

For a merge candidate list, a previous block belonging to a buffer or a motion information list or motion information of a previous block may be further added as a merge candidate.

Concretely, a redundance check between a motion information list and a merge candidate list may be performed. A redundance check may be performed for all or some of merge candidates belonging to a merge candidate list and all or some of previous blocks in a motion information list. But, for convenience of description, it is assumed that a redundance check of the present disclosure is performed for some of merge candidates belonging to a merge candidate list and some of previous blocks in a motion information list. In this case, some of merge candidates of a merge candidate list may include at least one of a left block or a top block among spatial merge candidates. But, it is not limited thereto, and it may be limited to a block of any one of spatial merge candidates or may additionally include at least one of a bottom-left block, a top-right block, a top-left block or a temporal merge candidate. Some of previous blocks of a motion information list may mean K previous blocks which are recently added to a motion information list. In this case, K may be 1, 2, 3 or more and may be a fixed value which is pre-promised in an encoding/decoding device.

For example, it is assumed that 5 previous blocks (or motion information of a previous block) are stored in a motion information list and 1 to 5 indexes are assigned to previous blocks, respectively. As an index is greater, it means a previous block which is recently stored. In this case, a redundance check of motion information between previous blocks having indexes 5, 4, and 3 and some of merge candidates of a merge candidate list may be performed. Alternatively, a redundance check between previous blocks having indexes 5 and 4 and some of merge candidates of a merge candidate list may be performed. Alternatively, excluding a previous block of index 5 which is most recently added, a redundance check between previous blocks having indexes 4 and 3 and some of merge candidates of a merge candidate list may be performed.

As a result of a redundance check, when there is at least one previous block having the same motion information, a previous block of a motion information list may not be added to a merge candidate list. On the other hand, when there is no previous block having the same motion information, all or some of previous blocks of a motion information list may be added to the last position of a merge candidate list. In this case, it may be added to a merge candidate list in an order of a previous block which is recently added in a motion information list (i.e., in an order from a large index to a small index). But, there may be a limit that a previous block which is most recently added to a motion information list (i.e., a previous block having the largest index) is not added to a merge candidate list. The previous block may be added by considering a size of a merge candidate list. For example, it is assumed that a merge candidate list has up to T merge candidates according to size information of the above-described merge candidate list. In this case, there may be a limit that a previous block is added until the number of merge candidates belonging to a merge candidate list becomes (T−n). In this case, n may be an integer such as 1, 2, or more. Alternatively, a previous block may be repeatedly added until the number of merge candidates belonging to a merge candidate list becomes T.

Whether a neighboring block may be used as a merge candidate may be adaptively determined according to a value of MVD_flag. In an example, when MVD_flag is 1, a block adjacent to a top-right corner, a bottom-left corner or a top-left corner of a current block may be set to be unavailable. Alternatively, when MVD_flag is 1, a temporal merge candidate may be set to be unavailable. Alternatively, when MVD_flag is 1, a combined merge candidate or a zero motion vector candidate may not be added to a merge candidate list. A combined merge candidate may be derived by an average of merge candidates which are pre-added to a merge candidate list.

In reference to FIG. 9, motion information of a current block may be derived based on a merge candidate list and a merge index (merge_idx) S910.

A merge index may specify any one of a plurality of merge candidates belonging to a merge candidate list. Motion information of a current block may be set as motion information of a merge candidate specified by a merge index. According to a value of MVD_flag, the maximum number of merge candidates which may be used by a current block may be adaptively determined. While up to M merge candidates may be used when MVD_flag is 0, N merge candidates less than M may be used when MVD_flag is 1.

Concretely, a merge index may be encoded/decoded based on MVD_flag. A merge index may be encoded/decoded only when MVD_flag is a first value. In this case, a merge index may have a value of 0 or 1. In other words, when a motion vector difference value is used in a merge mode, motion information of a current block may be derived by using only any one of the first merge candidate (merge_idx=0) or the second merge candidate (merge_idx=1) of a merge candidate list.

Accordingly, although the maximum number of merge candidates belonging to a merge candidate list is M, the maximum number of merge candidates which may be used by a current block may be 2 when a motion vector difference value is used in a merge mode. In this case, a value of M may be determined based on size information of the above-described merge candidate list and may be a value greater than 2.

But, it is not limited thereto. For example, the use of the first merge candidate may be forced by setting a merge index as 0 without encoding/decoding a merge index. Alternatively, a merge index may have a value between 0 to i and i may be an integer such as 2, 3 or more, but may be less than M.

In reference to FIG. 9, a motion vector difference value (MVD) for a merge mode of a current block may be derived S920.

A MVD of a current block may be derived based on a merge offset vector (offsetMV). A MVD may include at least one of MVD in a L0 direction (MVD0) or MVD in a L1 direction (MVD1) and each of MVD0 and MVD1 may be derived by using a merge offset vector.

A merge offset vector may be determined based on a length (mvdDistance) and a direction (mvdDirection) of a merge offset vector. For example, a merge offset vector (offsetMV) may be determined as in the following Equation 4.

offsetMV[x0][y0][0]=(mvdDistance[x0][y0]<<2)*
  mvdDirection[x0][y0][0]

offsetMV[x0][y0][1]=(mvdDistance[x0][y0]<<2)mvd-
  Direction[x0][y0][1]   [Equation 4]

In this case, mvdDistance may be determined by considering at least one of a distance index (distance_idx) or a predetermined flag (pic_fpel_mmvd_enabled_flag). A distance index (distance_idx) may mean an index which is encoded to specify a length or a distance of a motion vector difference value (MVD). pic_fpel_mmvd_enabled_flag may indicate whether a motion vector uses integer pixel precision in a merge mode of a current block. For example, when pic_fpel_mmvd_enabled_flag is a first value, a merge mode of a current block uses integer pixel precision. In other words, it may mean that motion vector resolution of a current block is an integer-pel. On the other hand, when pic_fpel_mmvd_enabled_flag is a second value, a merge mode of a current block may use decimal pixel precision. In other words, when pic_fpel_mmvd_enabled_flag is a second value, a merge mode of a current block may use integer pixel precision or decimal pixel precision. Alternatively, when pic_fpel_mmvd_enabled_flag is a second value, there may be a limit that a merge mode of a current block uses only decimal pixel precision. As an example of decimal pixel precision, there may be a ½ pel, a ¼ pel, a ⅛ pel, etc. For example, mvdDistance may be determined as in the following Table 1.

TABLE 1

| | MmvdDistance[x0][y0] | |
|---|---|---|
| distance_idx[x0][y0] | pic_fpel_mmvd_enabled_ flag == 0 | pic_fpel_mmvd_enabled_ flag == 1 |
| 0 | 1 | 4 |
| 1 | 2 | 8 |
| 2 | 4 | 16 |
| 3 | 8 | 32 |
| 4 | 16 | 64 |
| 5 | 32 | 128 |
| 6 | 64 | 256 |
| 7 | 128 | 512 |

In addition, mvdDirection may represent a direction of a merge offset vector and may be determined based on a direction index (direction_idx). In this case, a direction may include at least one of a left, right, top, bottom, top-left, bottom-left, top-right or bottom-right direction. For example, mvdDirection may be determined as in the following Table 2.

TABLE 2

| direction_idx[x0][y0] | mvdDirection[x0][y0] [0] | mvdDirection[x0][y0] [1] |
|---|---|---|
| 0 | +1 | 0 |
| 1 | −1 | 0 |
| 2 | 0 | +1 |
| 3 | 0 | −1 |

In Table 2, mvdDirection[x0][y0][0] may mean a sign of a x component of a motion vector difference value and mvdDirection[x0][y0][1] may mean a sign of a y component of a motion vector difference value. When direction_idx is 0, a direction of a motion vector difference value may be determined as a right direction, when direction_idx is 1, a direction of a motion vector difference value may be determined as a left direction, when direction_idx is 2, a direction of a motion vector difference value may be determined as a bottom direction and when direction_idx is 3, a direction of a motion vector difference value may be determined as a top direction, respectively.

The above-described distance index and direction index may be encoded/decoded only when MVD_flag is a first value. The above-described method of deriving a merge offset vector will be described in detail by referring to FIGS. 15 to 19.

On the other hand, a motion vector difference value (MVD) may be set the same as the above-determined merge offset vector. Alternatively, a merge offset vector may be modified by considering a POC difference (PocDiff) between a reference picture of a current block and a current picture to which a current block belongs and a modified merge offset vector may be set as a motion vector difference value (MVD). In this case, a current block may be encoded/decoded by bidirectional prediction and a reference picture of the current block may include a first reference picture (a reference picture in a L0 direction) and a second reference picture (a reference picture in a L1 direction). For convenience of description, hereinafter, a POC difference between a first reference picture and a current picture is referred to as PocDiff0 and a POC difference between a second reference picture and a current picture is referred to as PocDiff1.

When PocDiff0 and PocDiff1 are identical, MVD0 and MVD1 of a current block may be equally set as a merge offset vector, respectively.

In case that PocDiff0 and PocDiff1 are not identical, MVD0 may be equally set as a merge offset vector when an absolute value of PocDiff0 is greater than or the same as an absolute value of PocDiff1. On the other hand, MVD1 may be derived based on pre-set MVD0. For example, when first and second reference pictures are a long-term reference picture, MVD1 may be derived by applying a first scaling factor to MVD0. A first scaling factor may be determined based on PocDiff0 and PocDiff1. On the other hand, when at least one of a first or second reference picture is a short-term reference picture, MVD1 may be derived by applying a second scaling factor to MVD0. A second scaling factor may be a fixed value (e.g., −½, −1, etc.) which is pre-promised in an encoding/decoding device. But, a second scaling factor may be applied only when a sign of PocDiff0 is different from a sign of PocDiff1. If a sign of PocDiff0 is the same as a sign of PocDiff1, MVD1 may be set the same as MVD0 and separate scaling may not be performed.

On the other hand, in case that PocDiff0 and PocDiff1 are not identical, MVD1 may be equally set as a merge offset vector when an absolute value of PocDiff0 is less than an absolute value of PocDiff1. On the other hand, MVD0 may be derived based on pre-set MVD1. For example, when first and second reference pictures are a long-term reference picture, MVD0 may be derived by applying a first scaling factor to MVD1. A first scaling factor may be determined based on PocDiff0 and PocDiff1. On the other hand, when at least one of a first or second reference picture is a short-term reference picture, MVD0 may be derived by applying a second scaling factor to MVD1. A second scaling factor may be a fixed value (e.g., −½, −1, etc.) which is pre-promised in an encoding/decoding device. But, a second scaling factor may be applied only when a sign of PocDiff0 is different from a sign of PocDiff1. If a sign of PocDiff0 is the same as a sign of PocDiff1, MVD0 may be set the same as MVD1 and separate scaling may not be performed.

In reference to FIG. 9, a motion vector of a current block may be modified by using a motion vector difference value (MVD) S930 and motion compensation of a current block may be performed based on a modified motion vector S940.

FIGS. 10 to 14 show a previous block which may be used as a merge candidates as an embodiment to which the present disclosure is applied.

Figure 10:
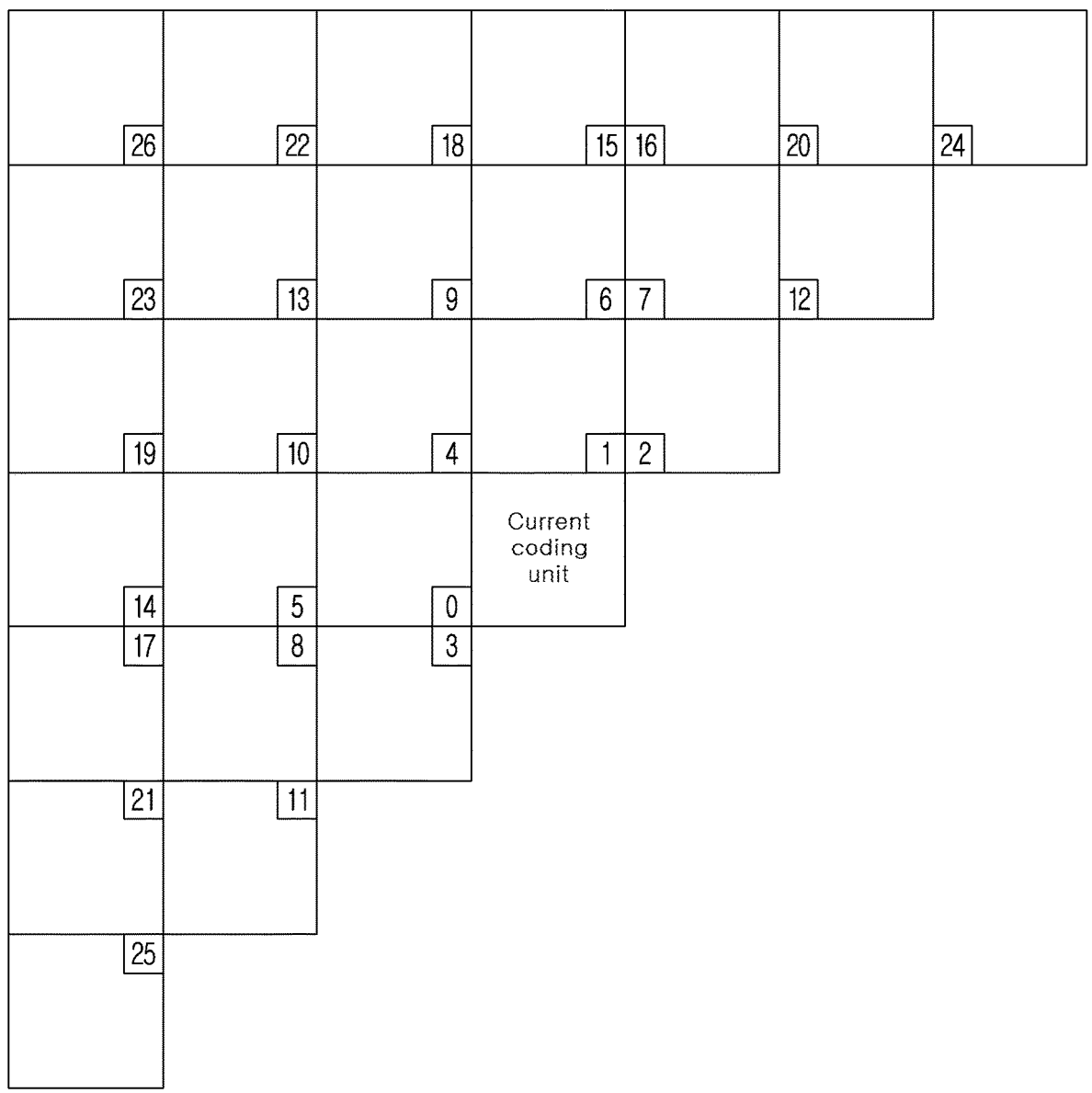
FIGS. 10 to 14 show a previous block which may be used as a merge candidate as an embodiment to which the present disclosure is applied.

A surrounding block used for a merge mode may be a block adjacent to a current coding unit such as merge index 0 to 4 of FIG. 10 (a block adjoining a boundary of a current coding unit) or may be a block which is not adjacent such as merge index 5 to 26 of FIG. 10.

When a distance from a current block is greater than a predefined threshold value, a merge candidate may be set to be unavailable.

For example, a predefined threshold value may be set as a height of a CTU (ctu_height) or ctu_height+N, which is referred to as a merge candidate available threshold value. In other words, when ($y_i$−$y_0$), a difference between a y-axis coordinate ($y_i$) of a merge candidate and a y-axis coordinate ($y_0$) of a top-left sample of a current coding unit (hereinafter, a current coding unit base sample), is greater than a merge candidate available threshold value, a merge candidate may be set to be unavailable. In this case, N is a predefined offset value. Concretely, for example, N may be set to be 16 or may be set to be ctu_height.

When there are lots of merge candidates passing a CTU boundary, a lot of unavailable merge candidates may be generated to reduce encoding efficiency. Merge candidates on the top of a coding unit (hereinafter, a top merge candidate) may be set as little as possible and merge candidates on the left and bottom of a coding unit (hereinafter, a bottom-left merge candidate) may be set as many as possible.

Figure 11:
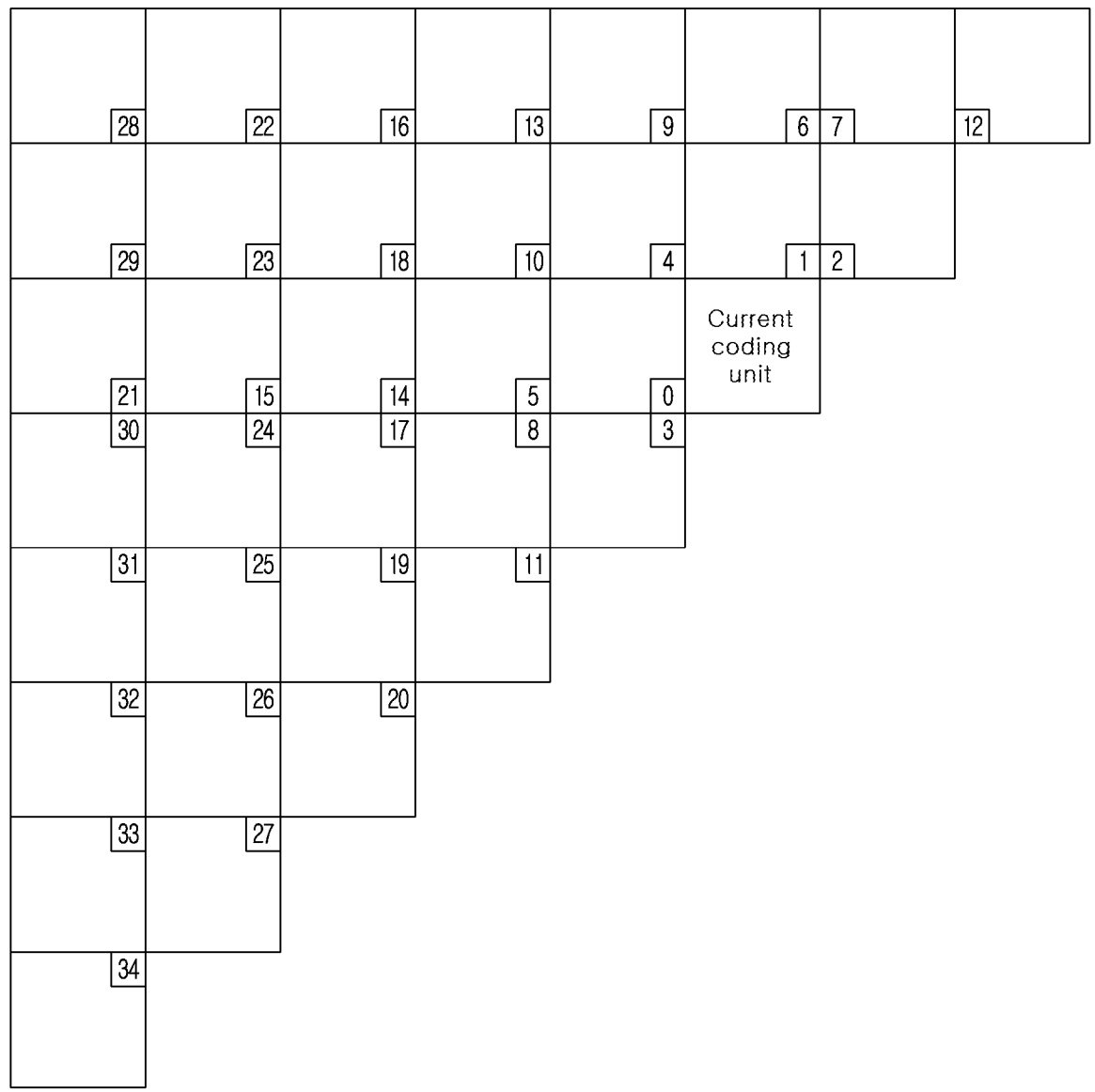

As in FIG. 11, a difference between a y-axis coordinate of a current coding unit base sample and a y-axis coordinate of a top merge candidate may be set not to exceed 2 times a height of a coding unit.

As in FIG. 11, a difference between a x-axis coordinate of a current coding unit base sample and a x-axis coordinate of a bottom-left merge candidate may be set not to exceed 2 times a width of a coding unit.

A merge candidate which is adjacent to a current coding unit is referred to as an adjacent merge candidate and a merge candidate which is not adjacent to a current coding unit is referred to as a non-adjacent merge candidate.

isAdjacentMergeflag, a flag representing whether a merge candidate of a current coding unit is an adjacent merge candidate, may be signaled.

When a value of isAdjacentMergeflag is 1, it represents that motion information of a current coding unit may be derived from an adjacent merge candidate and when a value of isAdjacentMergeflag is 0, it represents that motion information of a current coding unit may be derived from a non-adjacent merge candidate, which may be signaled in the following Table 3.

When a non-adjacent merge candidate is used as a merge candidate, a value of (NA_merge_idx[x0][y0]), a non-adjacent merge index which is a value subtracting the number of adjacent merge candidates (NumAdjMerge) from a merge index in the following Equation 5, may be signaled.

$$NA\_merge\_idx[x0][y0]=merge\_idx[x0][y0]-\text{Num-AdjMerge}$$ [Equation 5]

TABLE 3

| | Descriptor |
|---|---|
| coding_unit( x0, y0, cb Width, cbHeight, treeType ) { | |
|   if( slice_type != I ) { | |
|     pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) | |
|   { | |
|     intra_luma_mpm_flag[ x0 ][ y0 ] | |
|     if( intra_luma_mpm_flag[ x0 ][ y0 ] ) | |
|       intra_luma_mpm_idx[ x0 ][ y0 ] | ae(v) |
|     else | |
|       intra_luma_mpm_remainder[ x0 ][ y0 ] | ae(v) |
|   } | |
|   if( treeType = = SINGLE_TREE \|\| treeType = = DUAL_TREE_CHROMA ) | |
|     intra_chroma_pred_mode[ x0 ][ y0 ] | ae(v) |
|   } else { | |
|     if (cu_skip_falg[x0][y0]) { | |
|       if (MaxNumMergeCand > 1){ | |
| isAdjacentMergeflag | ae(v) |
| if (isAdjcanetMergeflag){ | |
| merge_idx[x0][y0] | ae(v) |
| } else{ | |
| NA_merge_idx[x0][y0] | ae(v) |
| } | |
| } | |
| } | |
| } else { /* MODE_INTER*/ | |
| merge_flag[x0][y0] | ae(v) |
|     if (merge_flag[x0][y0]){ | |
|     if (MaxNumMergeCand > 1){ | |
| isAdjacentMergeflag | ae(v) |
| if (isAdjcanetMergeflag){ | |
| merge_idx[x0][y0] | ae(v) |
| } else{ | |
| NA_merge_idx[x0][y0] | ae(v) |
| } | |
| } | |
| } | |
|   if( CuPredMode[ x0 ][ y0 ] != MODE_INTRA ) | |
|     cu_cbf | ae(v) |
|   if( cu_cbf ) { | |
|     transform_tree( x0, y0, cbWidth, cbHeight, tree Type ) | |
| } | |

A position of a non-adjacent merge candidate having a y-coordinate greater than an upper boundary of a current block may be determined based on a distance between a x-coordinate of an adjacent merge candidate and a coding unit base sample.

A non-adjacent merge candidate having the same x-coordinate as adjacent merge candidate A or a non-adjacent merge candidate that a distance with a x-coordinate of adjacent merge candidate A is within a threshold value is referred to as a merge candidate on the same vertical axis of A.

Figure 12:
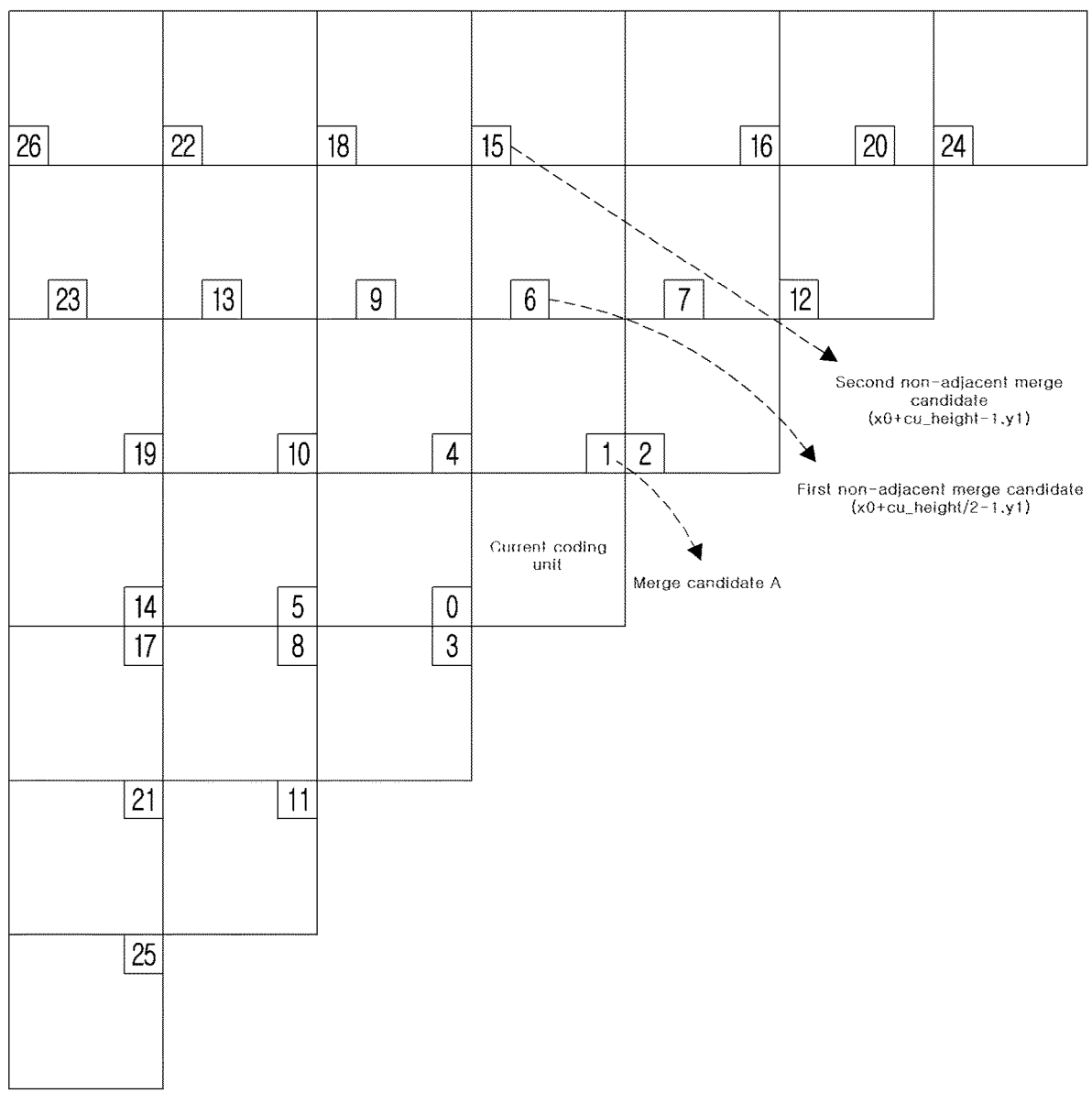

For example, as in FIG. 12, a x-coordinate of a merge candidate on the same vertical axis of A may be derived by subtracting an offset (hereinafter, a non-adjacent merge candidate offset) from a x-coordinate of an adjacent merge candidate. A non-adjacent merge candidate offset may have a fixed value or may be set to have a larger value as a distance between an adjacent merge candidate and a non-adjacent merge candidate is longer. An offset may be limited to a value smaller than a width of a current block.

Concretely, for example, when a coordinate of adjacent merge candidate A is (x0,y0) as in FIG. 12, a coordinate of a merge candidate on the same vertical axis which is closest to an adjacent merge candidate (hereinafter, a first non-adjacent merge candidate) may be set as (x0−(cu_height/2−1), y1) or (x0−(cu_width/2−1), y1).

A coordinate of a merge candidate on the same vertical axis which is closest to a first non-adjacent merge candidate (hereinafter, a second non-adjacent merge candidate) may be set as (x0−(cu_height−1), y2) or (x0−(cu_width−1), y2).

Figure 13:
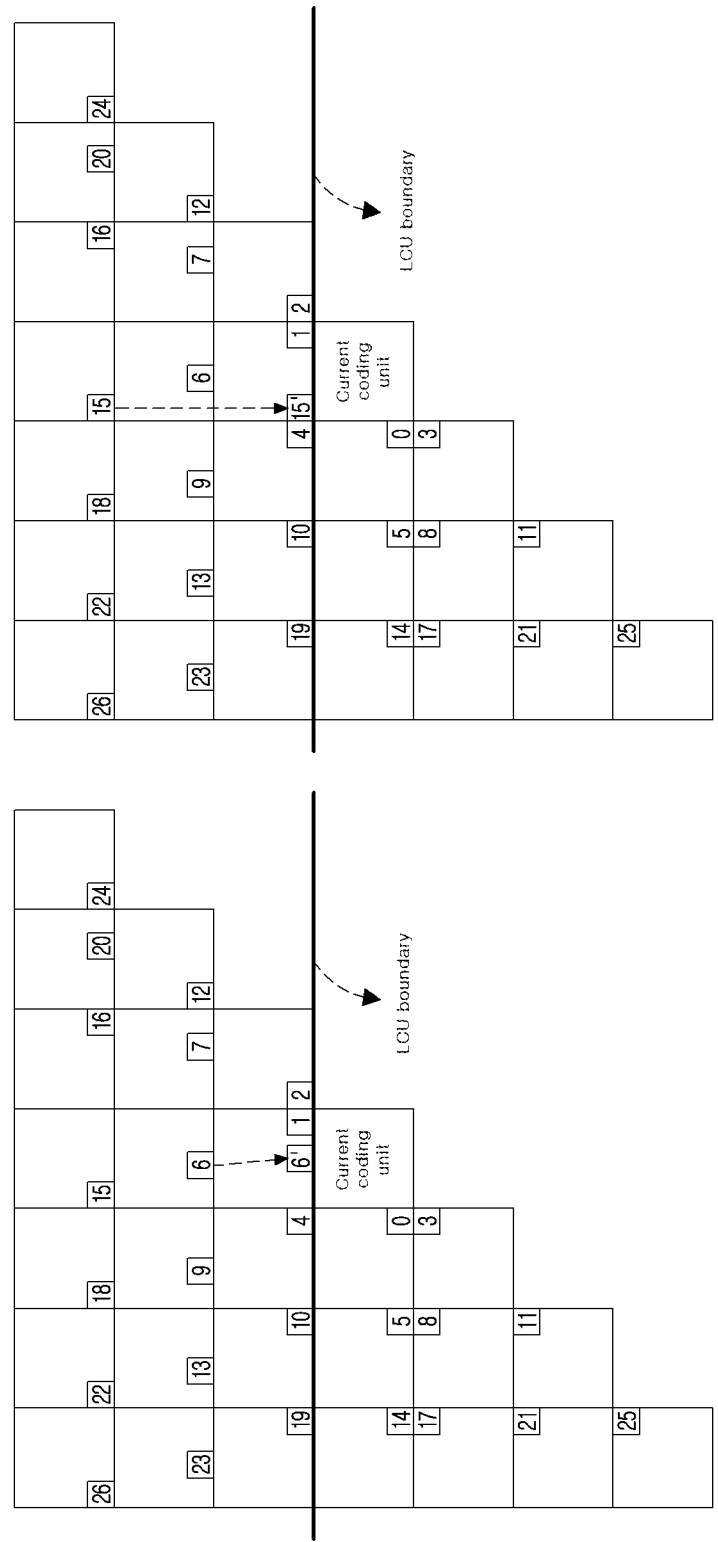
Figure 14:
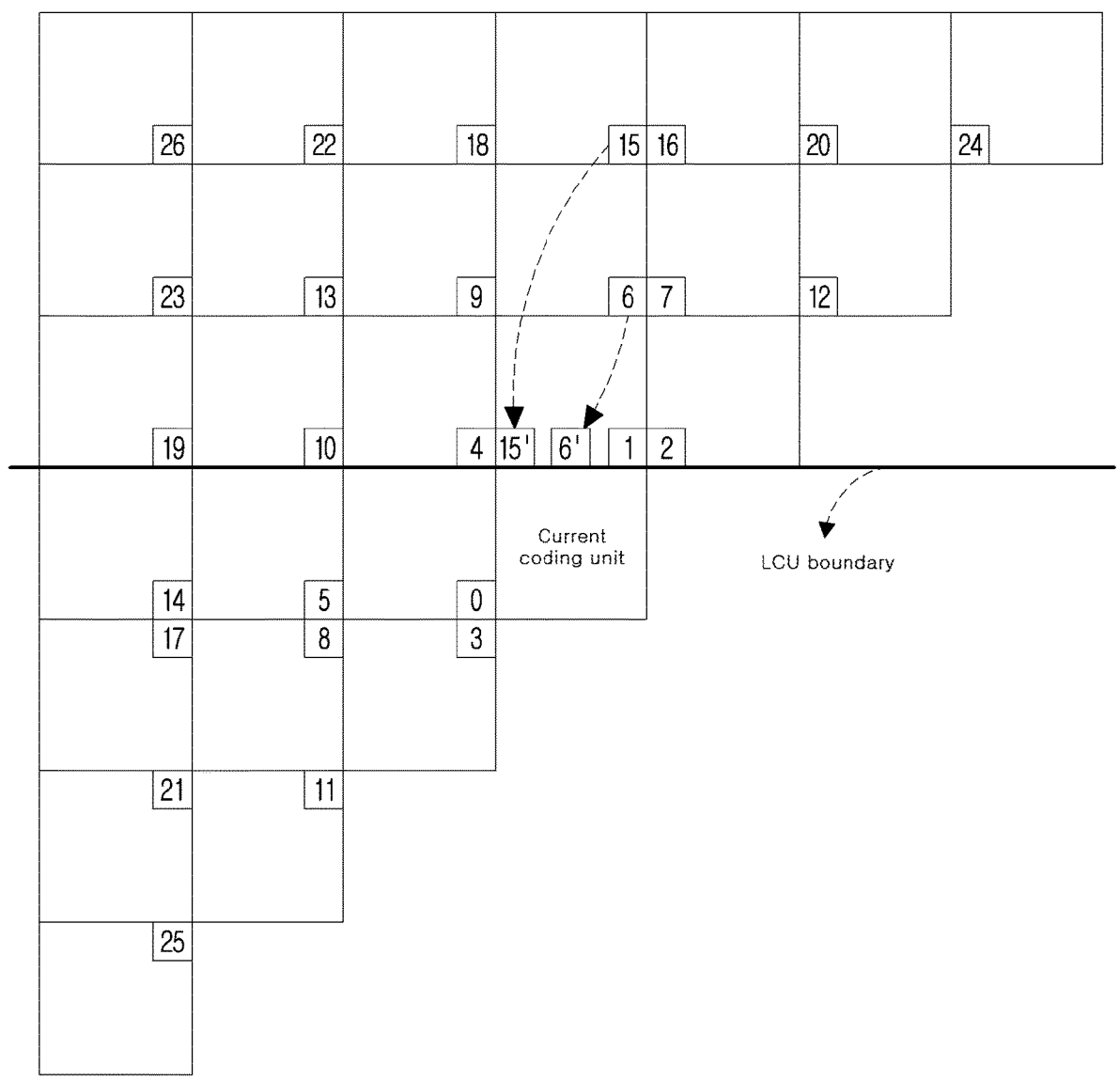

When a non-adjacent merge candidate is outside a LCU boundary, it may be set to derive a merge candidate from a sample which is closest to a non-adjacent merge candidate and adjacent to a LCU boundary as in FIG. 13.

For example, when an upper boundary of a current block adjoins a LCU boundary, a non-adjacent merge candidate may be substituted for a sample that non-adjacent merge candidate B and a x-coordinate are the same among samples adjoining a LCU boundary. Concretely, non-adjacent merge candidate B (a coordinate, (x1,y1)) (a merge candidate whose merge index is 6 in the left picture of FIG. 13) may be substituted for sample B' adjacent to a current coding unit (a coordinate, (x1,y0)) (a merge candidate whose merge index is 6' in the left picture of FIG. 13).

In another example, merge candidate C (a coordinate, (x2,y2)) (a merge candidate whose merge index is 15 in the right picture of FIG. 13) may be substituted for sample B' which has the same x-coordinate and is adjacent to a current coding unit (a coordinate, (x2,y0)) (a merge candidate whose merge index is 15' in the left picture of FIG. 13).

In another example, when merge candidates on the same vertical axis have the same x-coordinate, a non-adjacent merge candidate outside a LCU boundary may be substituted for a sample which subtracts an offset from a x-axis coordinate of a non-adjacent merge candidate among samples adjacent to a LCU boundary. Concretely, a non-adjacent merge candidate outside a LCU boundary as in FIG. 14 may be substituted for a sample adjacent to a current coding unit and a x-axis coordinate of a replaced sample may be derived by subtracting a specific offset from a non-adjacent merge candidate. In an example, a non-adjacent merge candidate offset may be used as a specific offset. A non-adjacent merge offset may be differently set per non-adjacent merge candidate outside a LCU boundary. In this case, a non-adjacent merge offset may be determined in an order of a non-adjacent merge candidate outside a LCU boundary.

When a non-adjacent merge candidate is unavailable, a non-adjacent merge candidate may be substituted for a sample that a non-adjacent merge offset is applied to a x-coordinate of a non-adjacent merge candidate among samples adjacent to a current block. As the number of unavailable non-adjacent merge candidates among merge candidates on the same vertical axis increases, a size of a non-adjacent merge offset may increase.

The above-mentioned description may be applied to a merge candidate on the same horizontal axis as well as a merge candidate on the same vertical axis. For a merge candidate on the same horizontal axis, a non-adjacent merge offset may be applied to a y-axis coordinate of a non-adjacent merge candidate.

FIGS. 15 to 19 show a method of deriving a merge offset vector for a merge mode as an embodiment to which the present disclosure is applied.

As in the following Table 4, when a value of a merge flag (merge_flag) or a skip flag (cu_skip_flag) is 1, at least one of a merge offset vector flag (MVD_flag), a merge index, a distance index, a direction index may be encoded/decoded.

TABLE 4

|  | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE \|\| treeType = = DUAL_TREE_LUMA ) | |
|   { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \|\| treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( merge_affine_flag[ x0 ][ y0 ] = = 0 && MaxNumMergeCand > 1 ) | |
|     { | |
|         merge_idx[ x0 ][ y0 ] | ae(v) |
|         merge_offset_vector_flag | ae(v) |
|         if (merge_idx < 2 && merge_offset_vector_flag) { | |
|           distance_idx[ x0 ][ y0 ] | ae(v) |
|           direction_idx[ x0 ][ y0 ] | ae(v) |
|         } | |
|       } | |
|     } else { | |
|       merge_flag[ x0 ][ y0 ] | ae(v) |
|       if( merge_flag[ x0 ][ y0 ] ) { | |
|         if( merge_affine_flag[ x0 ][ y0 ] = = 0 && MaxNumMergeCand > 1 ) | |
|       { | |
|           merge_idx[ x0 ][ y0 ] | ae(v) |
|           merge_offset_vector_flag | ae(v) |
|           if (merge_idx < 2 && merge_offset_vector_flag) { | |
|             distance_idx[ x0 ][ y0 ] | ae(v) |
|             direction_idx[ x0 ][ y0 ] | ae(v) |
|           } | |
|         } | |
|       } else { | |
|         if( slice_type = = B ) | |
|           inter_pred_idc[ x0 ][ y0 ] | ae(v) |
|         if( sps_affine_enabled_flag && chWidth >= 16 && cbHeight >= 16 ) { | |
|           inter_affine_flag[ x0 ][ y0 ] | ae(v) |
|           if( sps_affine_type_flag && inter_affine_flag[ x0 ][ y0 ] ) | |
|             cu_affine_type_flag[ x0 ][ y0 ] | ae(v) |
|         } | |
|       } | |
| } | |

A merge offset vector, offsetMV, may be derived from a distance index and a direction index.

Figure 15:
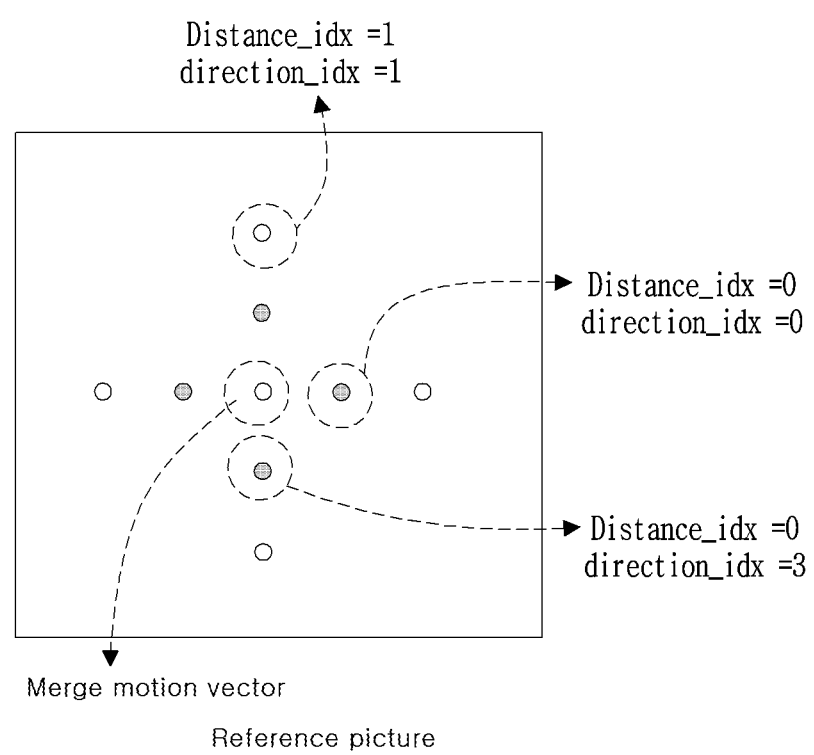
FIGS. 15 to 19 show a method of deriving a merge offset vector for a merge mode as an embodiment to which the present disclosure is applied.

As in FIG. 15, an optimum merge offset vector value may be derived by searching around the top and bottom and the left and right of a motion derived from a merge candidate. Each of a x-axis vector and a y-axis vector of a merge offset vector may be set to be less than up to 32 integer samples from a merge motion vector which becomes a base.

Only when a value of a merge index is less than a base value, a merge offset vector flag may be signaled. Alternatively, only when a merge candidate indicated by a merge index is bidirectional or unidirectional, a merge offset vector flag may be signaled.

A value resulting from subtracting a POC of a current picture from a POC of a reference picture L0 (as an abbreviation of Picture Order Count, an indicator representing an output order of a picture) is referred to as a reference picture L0 difference (PocDiff0) and a value resulting from subtracting a POC of a current picture from a POC of a reference picture L1 is referred to as a reference picture L1 difference (PocDiff1).

If a sign of a reference picture L0 difference is different from a sign of a reference picture L1 difference, offsetMV may be generated by multiplying DistFromMergeMV, a variable derived from a distance index, by a value derived from a direction index as in the following Equation 6.

$$\text{offsetMVL0}[0]=(\text{DistFromMergeMV}<<2)*\text{sign}[x0][y0][0]$$

$$\text{offsetMVL0}[1]=(\text{DistFromMergeMV}<<2)*\text{sign}[x0][y0][1]$$

$$\text{offsetMVL1}[0]=(\text{DistFromMergeMV}<<2)*\text{sign}[x0][y0][0]$$

$$\text{offsetMVL1}[1]=(\text{DistFromMergeMV}<<2)*\text{sign}[x0][y0][1] \quad \text{[Equation 6]}$$

If a sign of a reference picture L0 difference is the same as a sign of a reference picture L1 difference, offsetMV may be generated by multiplying DistFromMergeMV, a variable derived from a distance index, by a value derived from a direction index as in the following Equation 7.

$$\text{offsetMVL0}[0]=(\text{DistFromMergeMV}<<2)*\text{sign}[x0][y0][0]$$

$$\text{offsetMVL0}[1]=(\text{DistFromMergeMV}<<2)*\text{sign}[x0][y0][1]$$

$$\text{offsetMVL1}[0]=-1*(\text{DistFromMergeMV}<<2)*\text{sign}[x0][y0][0]$$

$$\text{offsetMVL1}[1]=-1*(\text{DistFromMergeMV}<<2)*\text{sign}[x0][y0][1] \quad \text{[Equation 7]}$$

DistFromMergeMV may be derived as in the following Table 5.

TABLE 5

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 1110 | 8 |
| 4 | 11110 | 16 |
| 5 | 111110 | 32 |
| 6 | 1111110 | 64 |
| 7 | 1111111 | 128 |

Less/more DistFromMergeMV values than shown in Table 5 may be used.

According to motion vector precision of a current block or a merge candidate, a range of DistFromMergeMV may be differently determined. For example, while DistFromMergeMV may be selected within a range of {1, 2, 4, 8, 16} when motion vector precision of a current block or a merge candidate is a quarter-pel, DistFromMergeMV may be selected within a range of {4, 8, 16, 32, 64} when motion vector precision of a current block or a merge candidate is an integer-pel.

The following Table 6 represents sign[x][y][0], a variable representing a x-axis offset, and sign[x][y][1], a variable representing a y-axis offset, defined according to a direction index value.

TABLE 6

| direction_idx[x][y] | binarization | sign[x][y][0] | sign[x][y][1] |
|---|---|---|---|
| 0 | 00 | +1 | 0 |
| 1 | 01 | −1 | 0 |
| 2 | 10 | 0 | +1 |
| 3 | 11 | 0 | −1 |

Each of a x-axis vector and a y-axis vector of a merge offset vector may be set to be less than up to 2 integer samples from a merge motion vector which becomes a base and distance_idx may be set to have a total of 4 indexes.

Alternatively, a merge offset vector range flag (merge_offset_range_flag), which is a syntax representing a search range of a merge offset vector, may be signaled in a picture header or a slice header, etc. In an example, when a value of merge_offset_extend_range_flag is 1, each of a x-axis vector and a y-axis vector of a merge offset vector may be set to be less than up to 32 integer samples from a merge motion vector which becomes a base and when a value of merge_offset_extend_range_flag is 0, each of a x-axis vector and a y-axis vector of a merge offset vector may be set be less than up to 2 integer samples from a merge motion vector which becomes a base.

TABLE 7

| distance_idx[x][y] | binarization | DistFromMergeMV[x0][y0] |
|---|---|---|
| 0 | 0 | 1 |
| 1 | 10 | 2 |
| 2 | 110 | 4 |
| 3 | 111 | 8 |

Figure 16:
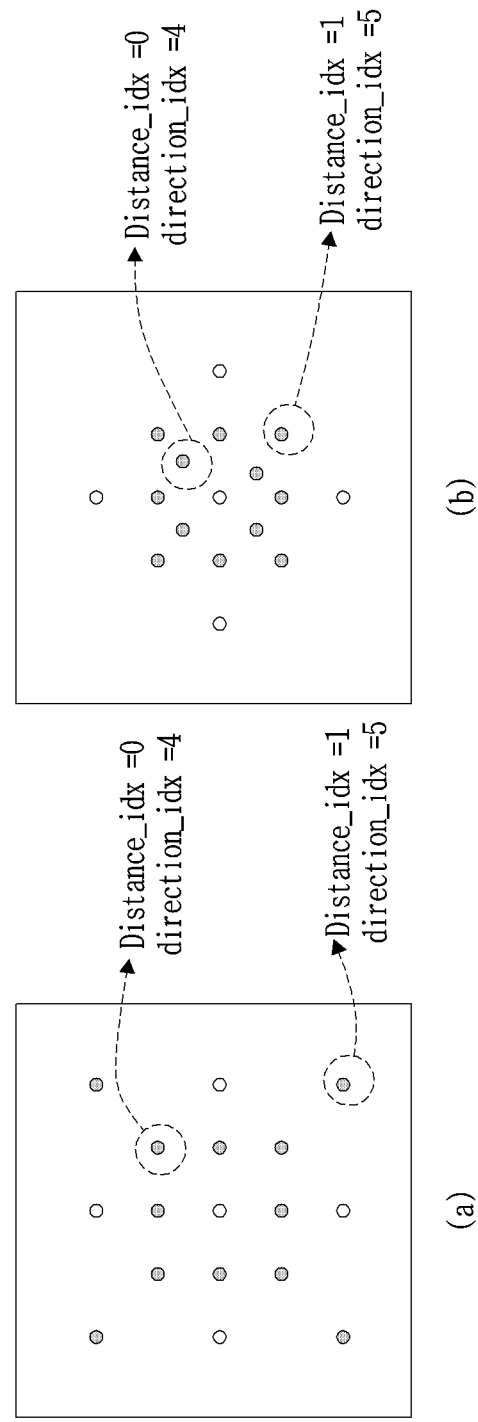
Figure 17:
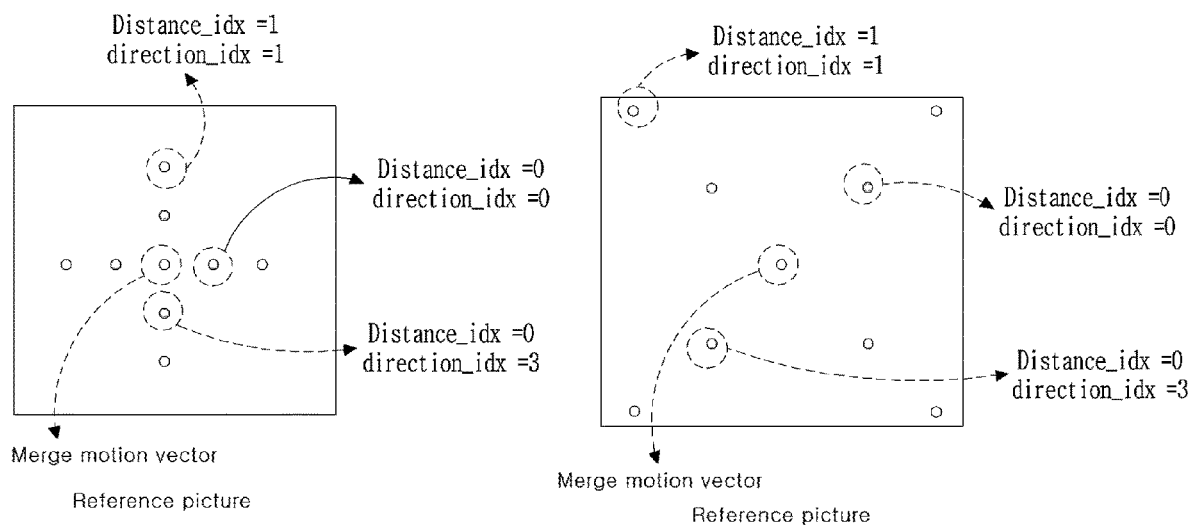

As in FIG. 16, an optimum merge offset vector value may be derived by searching around top, bottom, left, right, and diagonal directions of a motion derived from a merge candidate and direction_idx may be set to have a total of 8 indexes as in Table 8.

When a merge offset vector search range is the same as the left picture of FIG. 16, sign[x][y][0], a variable representing a x-axis offset, and sign[x][y][1], a variable representing a y-axis offset, may be represented by using Table 8 and when a merge offset vector search range is the same as the right picture of FIG. 16, sign[x][y][0], a variable representing a x-axis offset, and sign[x][y][1], a variable representing a y-axis offset, may be represented by using Table 8.

TABLE 8

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 4 | 100 | +1 | +1 |
| 5 | 101 | +1 | −1 |
| 6 | 110 | −1 | +1 |
| 7 | 111 | −1 | −1 |

TABLE 9

| direction_idx[x][y] | binarization | sign[x][y][0] | sign[x][y][1] |
|---|---|---|---|
| 0 | 000 | +1 | 0 |
| 1 | 001 | −1 | 0 |
| 2 | 010 | 0 | +1 |
| 3 | 011 | 0 | −1 |
| 4 | 100 | +½ | +½ |
| 5 | 101 | +½ | −½ |
| 6 | 110 | −½ | +½ |
| 7 | 111 | −½ | −½ |

Alternatively, according to whether a selected merge candidate has a bidirectional motion vector, it may have a different search range and search pattern. For example, when a selected merge candidate has a unidirectional motion vector (any one of a L0 motion vector or a L1 motion vector), it may be set to have a diamond-shaped search pattern as in the left picture of FIG. 17 and when a selected merge candidate has a bidirectional motion vector (a L0 motion vector and a L1 motion vector), it may be set to have a rectangular search pattern as in the right picture of FIG. 17.

It may have a different search range and search pattern according to a distance index value. For example, when a distance index value is less than a threshold value, it may be set to have a diamond-shaped search pattern and when a distance index value is greater than or the same as a threshold value, it may be set to have a rectangular search pattern.

According to motion vector precision of a current block or a merge candidate, it may have a different search range and search pattern. For example, when motion vector precision is less than or the same as an integer-pel (a ¼ pel, a ½ pel, etc.), it may be set to have a diamond-shaped search pattern and when motion vector precision is greater than an integer-pel, it may be set to have a rectangular pattern.

According to a value of DistFromMergeMV, a range of a search direction may be differently configured. In an example, while it may be searched in 8 directions such as an example of Table 8 or Table 9 when a value of DistFromMergeMV is equal to or less than a threshold value, it may be searched in 4 directions such as an example of Table 6 when a value of DistFromMergeMV is greater than a threshold value.

According to a difference value of MVx and MVy, a range of a search direction may be differently configured. In an example, while it may be searched in 8 directions such as an example of Table 8 or Table 9 when a difference value of MVx and MVy is equal to or less than a threshold value, it may be searched in 4 directions such as an example of Table 6 when a difference value of MVx and MVy is greater than a threshold value.

A final motion vector may be derived by adding offsetMV to mergeMV, a motion vector derived from a merge index, as in the following Equation 8.

$$mvL0[0] = mergeMVL0[0] + offsetMVL0[0]$$

$$mvL0[1] = mergeMVL0[0] + offsetMVL0[0]$$

$$mvL10[0] = mergeMVL1[0] + offsetMVL1[0]$$

$$mvL1[1] = mergeMVL1[0] + offsetMVL1[0] \quad \text{[Equation 8]}$$

offsetMV, a merge offset vector, may be derived from a first distance flag (hereinafter, distance_1st_flag), a second distance index (hereinafter, distance_2nd_idx) and a direction index. DistFromMergeMV may be derived by using a first distance index and a second distance index as in Equation 9.

$$DistFromMergeMV = 16*distance\_1st\_flag + (1<<distance\_2nd\_idx) \quad \text{[Equation 9]}$$

In Equation 9, distance_1st_flag may have a value of 0 or 1, distance_2nd_idx may have a value of 0 to 3 and DistFromMergeMV may be a value between 1 to 128. Concretely, for example, DistFromMergeMV may be a value of at least any one of {1, 2, 4, 8, 16, 32, 64, 128}.

A first distance flag (hereinafter, distance_1st_flag), a second distance index (hereinafter, distance_2nd_idx) and a direction index may be signaled by using a syntax table as in the following Table 10.

TABLE 10

| | Descriptor |
|---|---|
| coding_unit( x0, y0, cbWidth, cbHeight, treeType ) { | |
|   if( slice_type != I ) { | |
|     cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|     if( treeType = = SINGLE_TREE || treeType = = DUAL_TREE_LUMA ) | |
|     { | |
|       intra_luma_mpm_flag[ x0 ][ y0 ] | |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE || treeType = = DUAL_TREE_CHROMA ) | |
|       intra_chroma_pred_mode[ x0 ][ y0 ] | ae(v) |
|   } else { /* MODE_INTER */ | |
|     if( cu_skip_flag[ x0 ][ y0 ] ) { | |
|       if( merge_affine_flag[ x0 ][ y0 ] = = 0 && MaxNumMergeCand > 1 ) | |
|     { | |
|       merge_idx[ x0 ][ y0 ] | ae(v) |
|       merge_offset_vector_flag | ae(v) |
|       if (merge_idx < 2 && merge_offset_vector_flag) { | |
|         distance_1st_idx[ x0 ][ y0 ] | ae(v) |
|         distance_2nd_idx[ x0 ][ y0 ] | |
|         direction_idx[ x0 ][ y0 ] | ae(v) |
|       } | |
|     } | |
|     } else { | |
|       merge_flag[ x0 ][ y0 ] | ae(v) |
|       if( merge_flag[ x0 ][ y0 ] ) { | |
|       if( merge_affine_flag[ x0 ][ y0 ] = = 0 && MaxNumMergeCand > 1 ) | |
|     { | |
|       merge_idx[ x0 ][ y0 ] | ae(v) |
|       merge_offset_vector_flag | ae(v) |
|       if (merge_idx < 2 && merge_offset_vector_flag) { | |
|         distance_1st_idx[ x0 ][ y0 ] | ae(v) |
|         distance_2nd_idx[ x0 ][ y0 ] | ae(v) |
|         direction_idx[ x0 ][ y0 ] | ae(v) |
|       } | |
|     } | |
|     } else { | |
|       if( slice_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
|     } | |
| } | |

When a sub-block merge candidate is used, the same merge offset vector may be used for all sub-blocks.

A merge candidate in a unit of a sub-block may be derived as in the following process.
1. An initial shift vector (shVector) may be derived from a motion vector of a surrounding merge candidate block of a current block.
2. As in Equation 10, a shift sub-block where a position of a top-left sample is (xColSb, yColSb) may be derived by adding an initial shift vector to (xSb,ySb), a top-left sample of a sub-block in a coding unit.

(xColSb,yColSb)=(xSb+shVector[0]>>4,ySb+shVector[1]>>4)      [Equation 10]

3. A motion vector of a collocated block corresponding to a center position of a sub-block including (xColSb, yColSb) may be derived as a motion vector of a sub-block including a top-left sample, (xSb,ySb).

A different merge offset vector may be derived in a unit of a sub-block of a coding unit, which is referred to as a merge offset vector encoding method in a unit of a sub-block.

Figure 18:
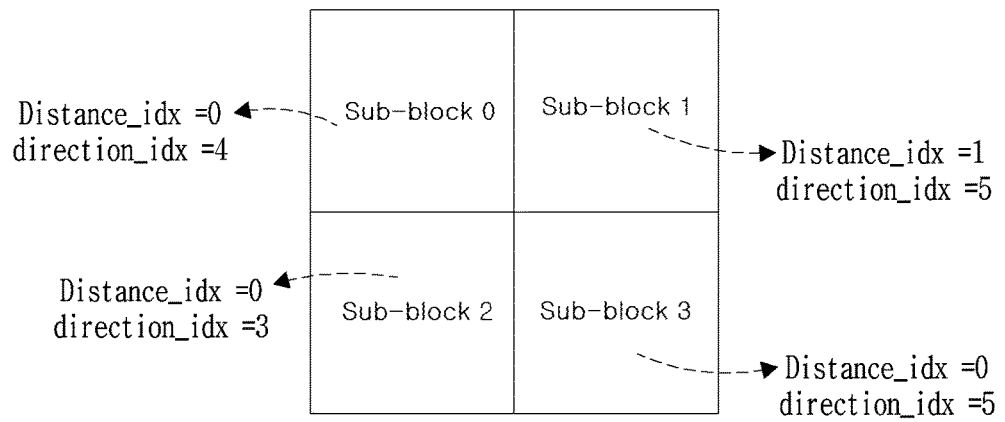

In an example, as in FIG. 18, a coding unit may be partitioned into sub-blocks of a M×M unit and a different merge offset vector may be used in a unit of a sub-block. Both a distance index and a direction index may be set to be different from a previous sub-block.

Alternatively, the same DistFromMergeMV may be applied to all sub-blocks, but Direction may be individually determined. Conversely, the same Direction may be applied to all sub-blocks, but DistFromMergeMV may be individually determined.

Alternatively, a merge offset vector may be applied to only some of sub-blocks. In an example, when a current block is partitioned into 2 sub-blocks, motion information of a first sub-block may be set the same as motion information of a merge candidate indicated by a merge index and motion information of a second sub-block may be derived by applying a merge offset vector to motion information of a first sub-block. Concretely, for example, a first sub-block may be a left triangular prediction unit and a second sub-block may be a right triangular prediction unit. A left triangular prediction unit may be as follows.

Figure 19:
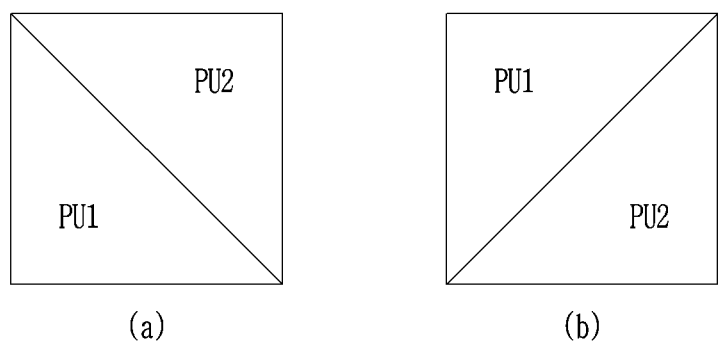

The left picture of FIG. 19 is referred to as left triangular partitioning and the right picture is referred to as right triangular partitioning. A prediction unit to which a top-left or bottom-left sample of a coding unit belongs is referred to as a left triangular prediction unit, a prediction unit to which a top-right or bottom-right sample of a coding unit belongs is referred to as a right triangular prediction unit and a right triangular prediction unit or a left triangular prediction unit is collectively referred to as a triangular prediction unit.

FIGS. 20 to 24 show an intra prediction method as an embodiment to which the present disclosure is applied.

Figure 20:
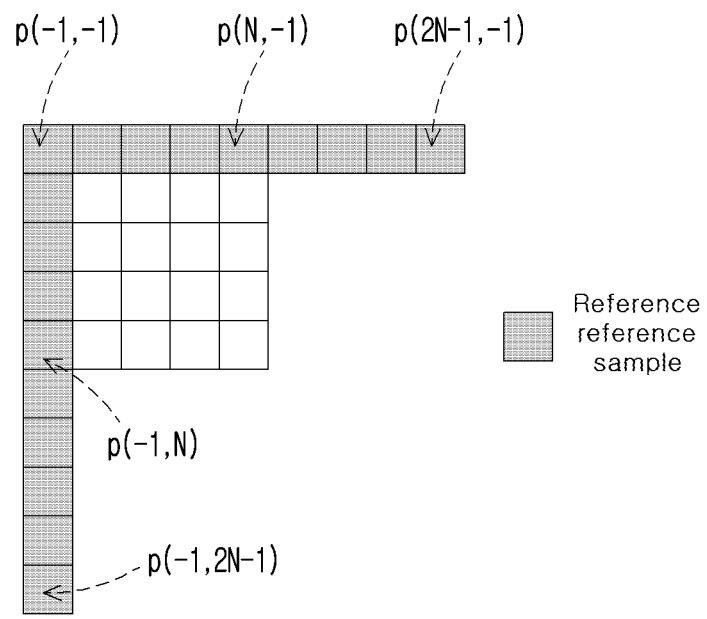
FIGS. 20 to 24 show an intra prediction method as an embodiment to which the present disclosure is applied.

For intra prediction, as in FIG. 20, a pre-encoded boundary sample around a current block is used to generate intra prediction, which is referred to as an intra reference sample.

Intra prediction may be performed by setting an average value of an intra reference sample as a value of all samples of a prediction block (a DC mode), or by generating a prediction sample by performing weighted prediction for a prediction sample in a horizontal direction and a prediction sample in a vertical direction after generating a prediction sample in a horizontal direction generated by performing reference weighted prediction in a horizontal direction and a prediction sample in a vertical direction generated by performing weighted prediction for a reference sample in a vertical direction (a Planar mode), or by using a directional intra prediction mode, etc.

Figure 21:
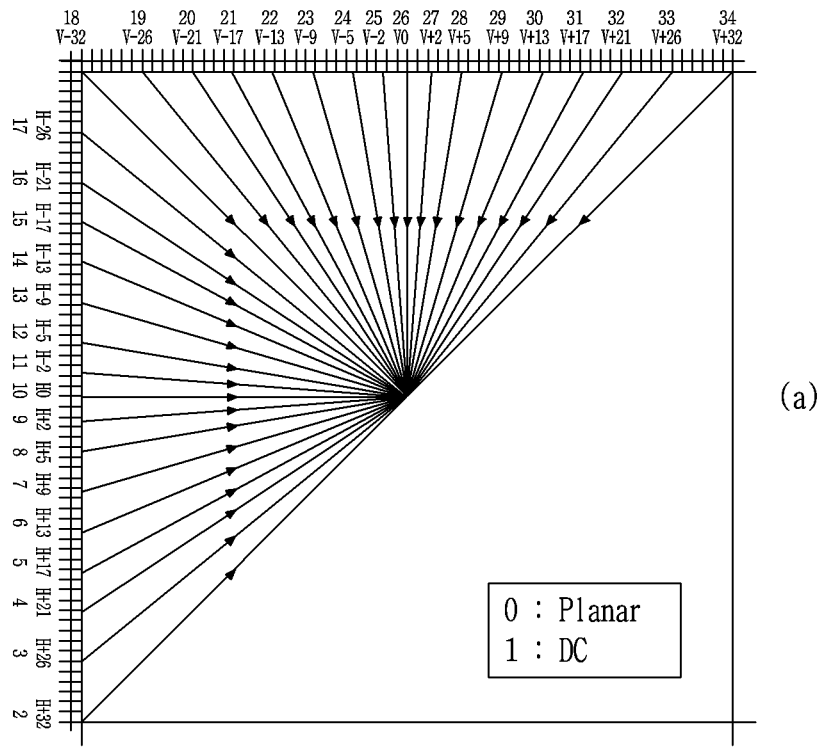
Figure 21:
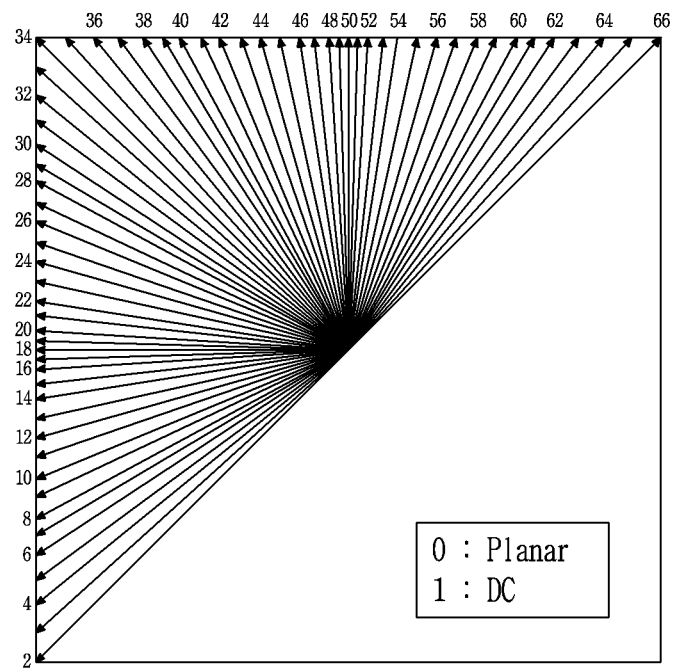

Intra prediction may be performed by using 33 directions (a total of 35 intra prediction modes) as in the left picture of FIG. 21 or by using 65 directions (a total of 67 intra prediction modes) as in the right picture. When directional intra prediction is used, an intra reference sample (a reference reference sample) may be generated by considering directivity of an intra prediction mode and hereupon, intra prediction may be performed.

An intra reference sample at a left position of a coding unit is referred to as a left intra reference sample and an intra reference sample at a top position of a coding unit is referred to as a top intra reference sample.

When directional intra prediction is performed, an intra directional parameter (intraPredAng), a parameter representing a prediction direction (or a prediction angle), may be set according to an intra prediction mode as in Table 11. The following Table 11 is just an example which is based on a directional intra prediction mode having a value of 2 to 34 when 35 intra prediction modes are used. It is natural that as a prediction direction (or a prediction angle) of a directional intra prediction mode is more subdivided, 33 or more directional intra prediction modes may be used.

TABLE 11

| PredModeIntra | 1   | 2   | 3   | 4   | 5   | 6   | 7   |
|---|---|---|---|---|---|---|---|
| IntraPredAng  | —   | 32  | 26  | 21  | 17  | 13  | 9   |
| PredModeIntra | 8   | 9   | 10  | 11  | 12  | 13  | 14  |
| IntraPredAng  | 5   | 2   | 0   | −2  | −5  | −9  | −13 |
| PredModeIntra | 15  | 16  | 17  | 18  | 19  | 20  | 21  |
| IntraPredAng  | −17 | −21 | −26 | −32 | −26 | −21 | −17 |
| PredModeIntra | 22  | 23  | 24  | 25  | 26  | 27  | 28  |
| IntraPredAng  | −13 | −9  | −5  | −2  | 0   | 2   | 5   |
| PredModeIntra | 29  | 30  | 31  | 32  | 33  | 34  |     |
| IntraPredAng  | 9   | 13  | 17  | 21  | 26  | 32  |     |

Figure 22:
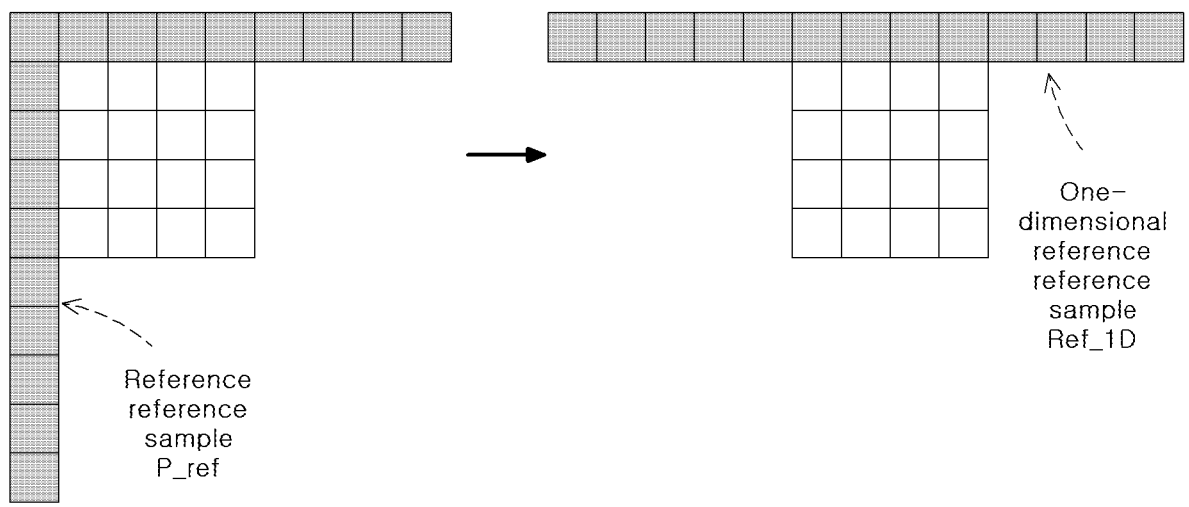

When intraPredAng is a negative number (e.g., an intra prediction mode index is between 11 and 25), a left intra reference sample and a top intra reference sample of a current block may be reconfigured as a one-dimensional reference sample (Ref_1D) configured with 1D according to an angle of an intra prediction mode as in FIG. 22.

Figure 23:
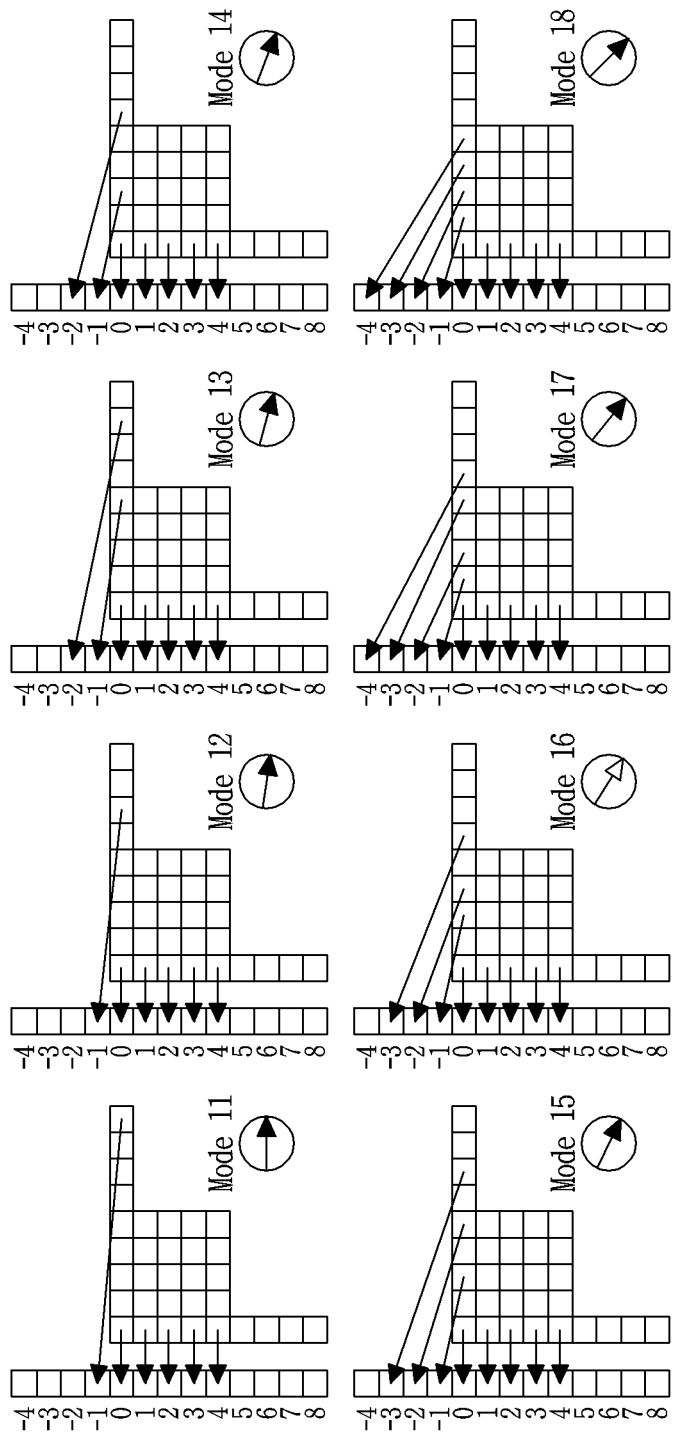

When an intra prediction mode index is between 11 and 18, a one-dimensional reference sample may be generated in a counterclockwise direction from an intra reference sample positioned at the right of a top side of a current block to an intra reference sample positioned at the bottom of a left side as in FIG. 23.

In other modes, a one-dimensional reference sample may be generated by using only an intra reference sample on a top side or an intra reference sample on a left side.

Figure 24:
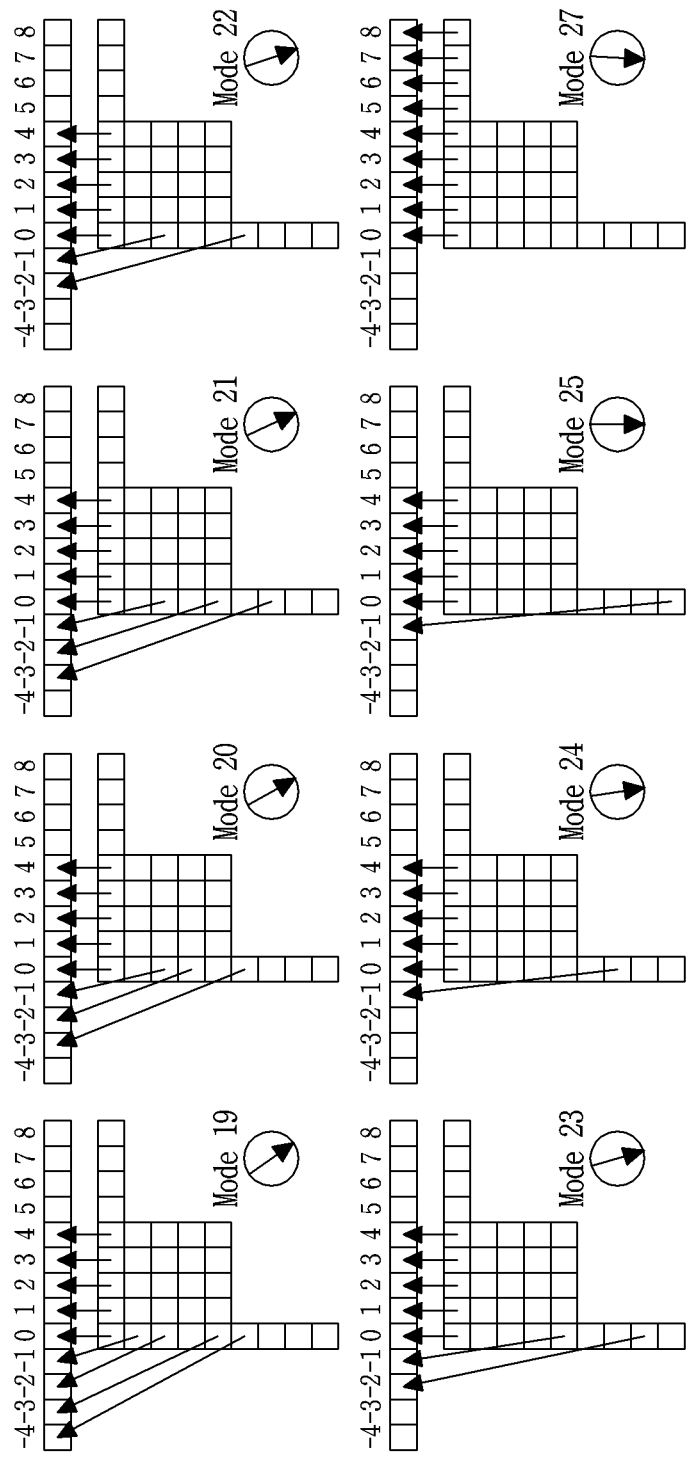

When an intra prediction mode index is between 19 and 25, an one-dimensional reference sample may be generated in a clockwise direction from an intra reference sample positioned at the bottom of a left side of a current block to an intra reference sample positioned at the right of a top side as in FIG. 24.

$i_{Idx}$, a reference sample determination index, and $i_{fact}$, a weight-related parameter applied to at least one reference sample determined based on $i_{Idx}$, may be derived as in the following Equation 11. $i_{Idx}$ and $i_{fact}$ may be variably determined according to a slope of a directional intra prediction mode and a reference sample specified by $i_{Idx}$ may correspond to an integer pel.

$$i_{Idx}=(y+1)*P_{ang}/32$$

$$i_{fact}=[(y+1)*P_{ang}] \& 31 \quad \text{[Equation 11]}$$

A prediction image may be derived by specifying at least one or more one-dimensional reference samples per prediction sample. For example, a position of an one-dimensional reference sample which may be used to generate a prediction sample may be specified by considering a slope value of a directional intra prediction mode. Each prediction sample may have a different directional intra prediction mode. A plurality of intra prediction modes may be used for one prediction block. A plurality of intra prediction modes may be represented by a combination of a plurality of nondirectional intra prediction modes, may be represented by a combination of one nondirectional intra prediction mode and at least one directional intra prediction mode or may be represented by a combination of a plurality of directional intra prediction modes. A different intra prediction mode may be applied per predetermined sample group in one prediction block. A predetermined sample group may be configured with at least one sample. The number of samples groups may be variably determined according to a size/the number of samples of a current prediction block or may be the fixed number which is preset in an encoder/a decoder independently from a size/the number of samples of a prediction block.

Concretely, for example, a position of a one-dimensional reference sample may be specified by using iIdx, a reference sample determination index.

When a slope of an intra prediction mode may not be represented only by one one-dimensional reference sample according to a slope of an intra prediction mode, a first prediction image may be generated by interpolating an adjacent one-dimensional reference sample as in Equation 12. When an angular line according to a slope/an angle of an intra prediction mode does not pass a reference sample positioned at an integer pel, a first prediction image may be generated by interpolating a reference sample adjacent to the left/right or the top/bottom of a corresponding angular line. A filter coefficient of an interpolation filter used in this case may be determined based on if act. For example, a filter coefficient of an interpolation filter may be derived based on a distance between a fractional-pel positioned on an angular line and a reference sample positioned at the integer-pel.

$$P(x,y)=((32-i_{fact})/32)*\text{Ref}\_1D(x+i_{Idx}+1)+(i_{fact}/32)*\text{Ref}\_1D(x+i_{Idx}+2)$$ [Equation 12]

When a slope of an intra prediction mode may be represented by only one one-dimensional reference sample (when a value of $i_{fact}$ is 0), a first prediction image may be generated as in the following Equation 13.

$$P(x,y)=\text{Ref}\_1D(x+i_{Idx}+1)$$ [Equation 13]

FIGS. 25 to 28 show a wide-angle-based intra prediction method as an embodiment to which the present disclosure is applied.

Figure 25:
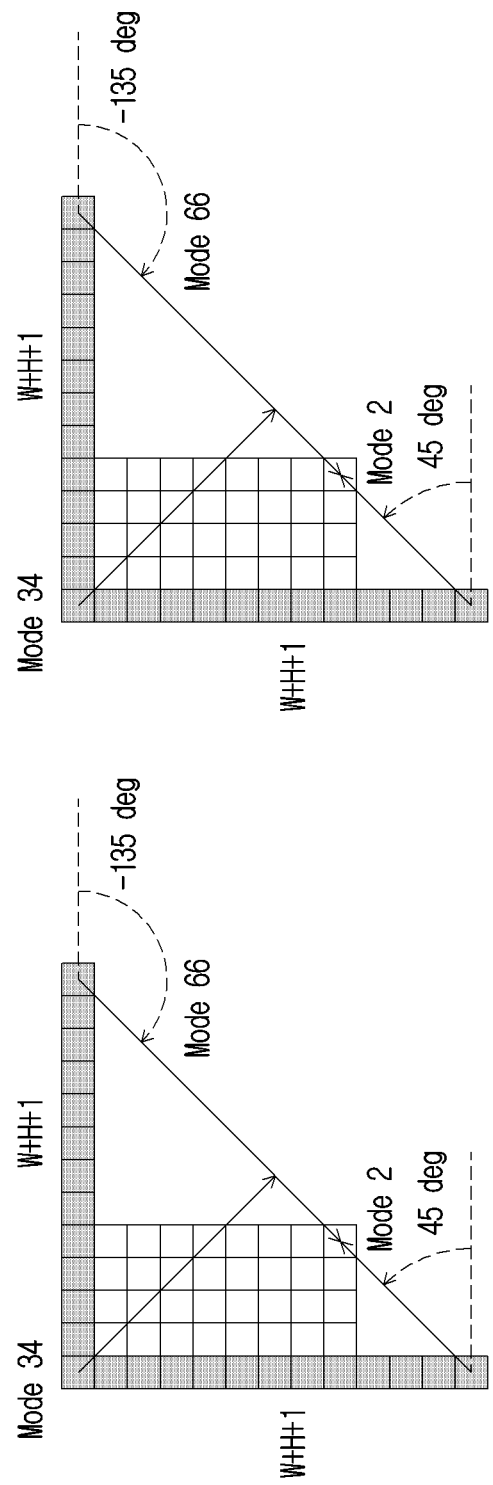
FIGS. 25 to 28 show a wide-angle-based intra prediction method as an embodiment to which the present disclosure is applied.

A prediction angle of a directional intra prediction mode may be set between 45 degrees and −135 degrees as in FIG. 25.

When an intra prediction mode is performed in a non-square coding unit, a disadvantage that a current sample is predicted using an intra reference sample distant from a current sample instead of an intra reference sample close to a current sample may be generated due to a predefined prediction angle.

For example, as in the left picture of FIG. 26, for a coding unit that a width of a coding unit is greater than a height of a coding unit (hereinafter, a coding unit in a horizontal direction), intra prediction may be performed in a distant L instead of a close sample T. In another example, as in the right picture of FIG. 26, for a coding unit that a height of a coding unit is greater than a width of a coding unit (hereinafter, a coding unit in a vertical direction), intra prediction may be performed in a distant sample T instead of a close sample L.

In a non-square coding unit, intra prediction may be performed with a prediction angle wider than a pre-defined prediction angle, which is referred to as a wide-angle intra prediction mode.

A wide-angle intra prediction mode may have a prediction angle of 45-α to −135-β and a prediction angle out of an angle used in the existing intra prediction mode is referred to as a wide-angle angle.

Figure 26:
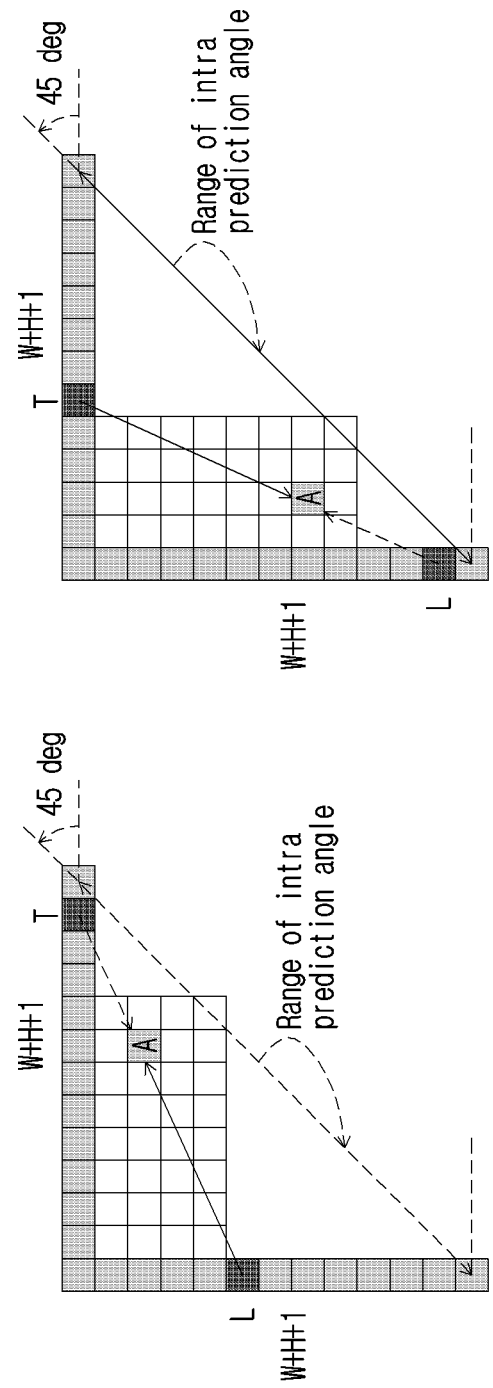

In the left picture of FIG. 26, sample A in a coding unit in a horizontal direction may be predicted from intra reference sample T by using a wide-angle intra prediction mode.

In the right picture of FIG. 26, sample A in a coding unit in a vertical direction may be predicted from intra reference sample L by using a wide-angle intra prediction mode.

A wide-angle intra prediction mode may use N+20 intra prediction modes by adding 20 wide-angle angles to N existing intra prediction modes. Concretely, for example, when 67 intra modes are used, a total of 87 intra prediction modes may be used by adding an wide-angle angle as in Table 12.

TABLE 12

| predModeIntra | −10 | −9 | −8 | −7 | −6 | −5 | −4 | −3 | −2 | −1 | 2 | 3 | 4 | 5 | 6 | 7 | 8 |
| --- | --- | --- | --- | --- | --- | --- | --- | --- | --- | --- | --- | --- | --- | --- | --- | --- | --- |
| intraPredAngle | 114 | 93 | 79 | 68 | 60 | 54 | 49 | 45 | 39 | 35 | 32 | 29 | 26 | 23 | 21 | 19 | 17 |
| predModeIntra | 9 | 10 | 11 | 12 | 13 | 14 | 15 | 16 | 17 | 18 | 19 | 20 | 21 | 22 | 23 | 24 | 25 |
| intraPredAngle | 15 | 13 | 11 | 9 | 7 | 5 | 3 | 2 | 1 | 10 | −1 | −2 | −3 | −5 | −7 | −9 | −11 |
| predModeIntra | 26 | 27 | 28 | 29 | 30 | 31 | 32 | 33 | 34 | 35 | 36 | 37 | 38 | 39 | 40 | 41 | 42 |
| intraPredAngle | −13 | −25 | −17 | −19 | −21 | −23 | −26 | −29 | −32 | −29 | −26 | −23 | −21 | −19 | −17 | −15 | −13 |
| predModeIntra | 43 | 44 | 45 | 46 | 47 | 48 | 49 | 50 | 51 | 52 | 53 | 54 | 55 | 56 | 57 | 58 | 59 |
| intraPredAngle | −11 | −9 | −7 | −5 | −3 | −2 | −1 | 0 | |1 | 2 | 3 | 5 | 7 | 9 | 11 | 13 | 15 |
| predModeIntra | 60 | 61 | 62 | 63 | 64 | 65 | 66 | 67 | 68 | 69 | 70 | 71 | 72 | 73 | 74 | 75 | 76 |
| intraPredAngle | 17 | 19 | 21 | 23 | 26 | 29 | 32 | 35 | 39 | 45 | 49 | 54 | 60 | 68 | 79 | 93 | 114 |

Figure 27:
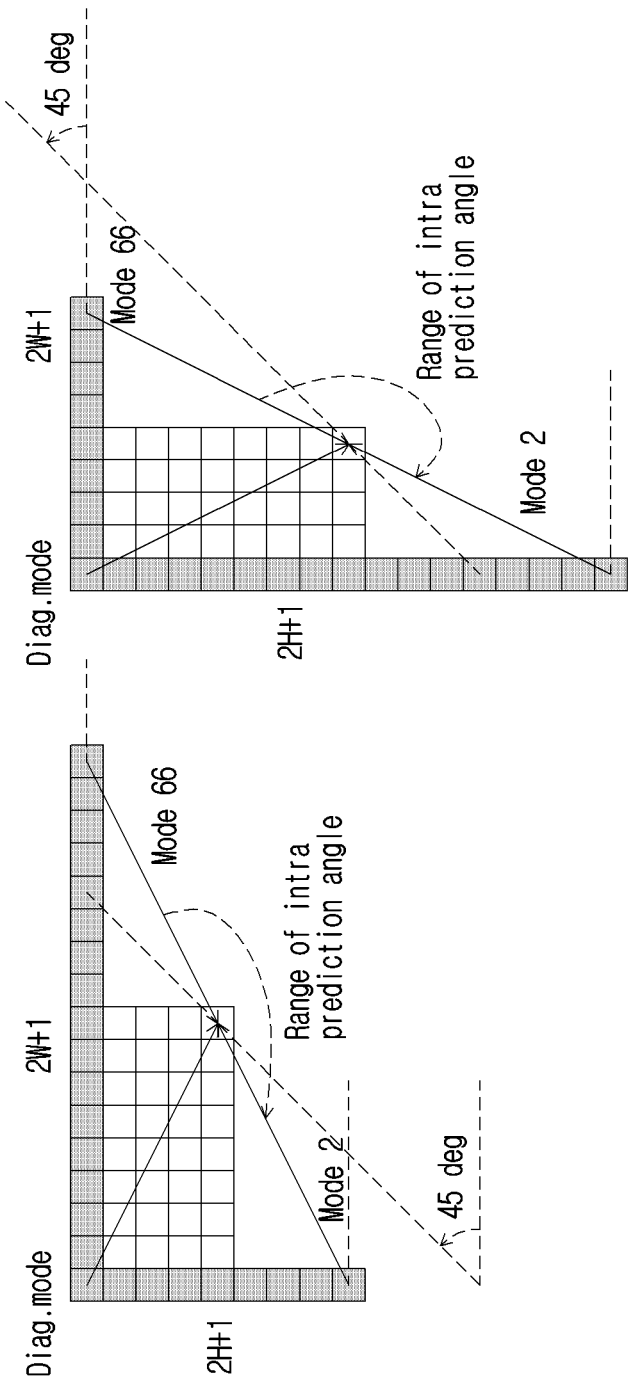

When a wide-angle intra prediction mode is used, a length of a top intra reference sample may be set as 2W+1 and a length of a left intra reference sample may be set as 2H+1 as in FIG. 27.

When an intra prediction mode of a wide-angle intra prediction mode is encoded in using wide-angle intra prediction, the number of intra prediction modes increases, so encoding efficiency may be reduced. A wide-angle intra prediction mode may be encoded by being replaced with the existing intra prediction mode which is not used in wide-angle intra and a replaced prediction mode is referred to as a wide-angle replaced mode.

Figure 28:
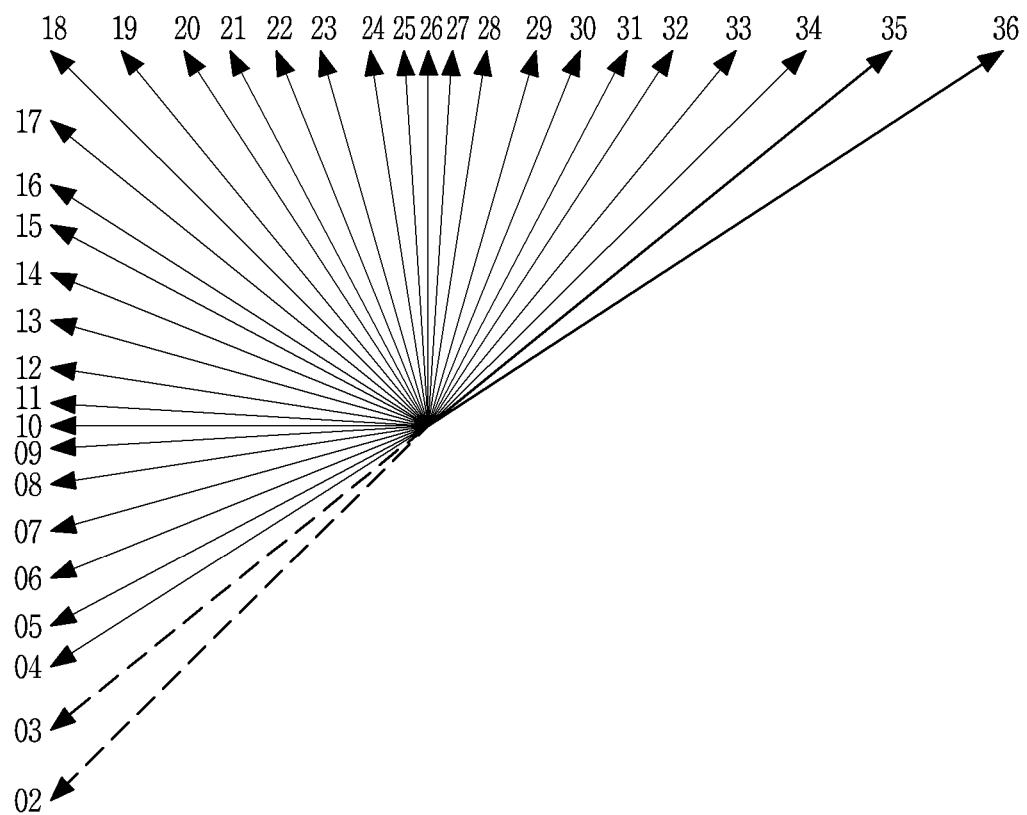

Concretely, for example, when 35 intra prediction are used as in FIG. 28, a wide-angle intra prediction mode 35 may be encoded into an intra prediction mode 2, a wide-angle replaced mode, and a wide-angle intra prediction mode 36 may be encoded into an intra prediction mode 3, a wide-angle replaced mode.

A replaced mode and the number may be differently set according to a shape of a coding block or a ratio of a height and a width of a coding block. Concretely, for example, a replaced mode and the number may be differently set according to a shape of a coding block as in Table 13. Table 13 represents a replaced intra prediction mode used according to a ratio of a width and a height of a coding block.

TABLE 13

| Aspect ratio | Replaced intra prediction modes |
| --- | --- |
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

A prediction image may be generated by the above-described inter prediction or intra prediction and an image subtracting a prediction image from an original image, i.e., a residual image, may be obtained.

A residual image may be decomposed into two-dimensional frequency components through two-dimensional transform such as DCT (Discrete cosine transform). There is a feature that visual distortion is not generated significantly although a high-frequency component is removed from an image. When a value corresponding to high frequency is set to be small or 0, compression efficiency may be improved without significant visual distortion.

DST (Discrete sine transform) may be used according to a size of a prediction block or a prediction mode. Concretely, for example, when it is an intra prediction mode and a size of a prediction block/a coding block is smaller than N×N, it may be set to use DST transform and for other prediction block/coding block, it may be set to use DCT.

DCT is a process in which an image is decomposed (transformed) into two-dimensional frequency components by using cos transform and frequency components in this case are represented as a base image. For example, when DCT transform is performed in a N×N block, $N^2$ basic pattern components may be obtained. Performing DCT transform means that a size of each basic pattern component included in an original pixel block is found. A size of each basic pattern component is referred to as a DCT coefficient.

Generally, in an image where many non-zero components are distributed at low frequencies, DCT (Discrete Cosine Transform) is mainly used, and in an image where many high frequency components are distributed, DST (Discrete Sine Transform) may be used.

DST represents a process in which an image is decomposed (transformed) into two-dimensional frequency components by using sin transform. A two-dimensional image may be decomposed (transformed) into two-dimensional frequency components by using a transform method excluding DCT or DST transform, which is referred to as two-dimensional image transform.

Two-dimensional image transform may not be performed in a specific block among residual images, which is referred to as a transform skip. After a transform skip, quantization may be applied.

DCT or DST or two-dimensional image transform may be applied to an arbitrary block in a two-dimensional image and transform used in this case is referred to as first transform. Transform may be re-performed in some regions of a transform block after first transform is performed, which is referred to as second transform.

First transform may use one of a plurality of transform cores. Concretely, for example, any one of DCT2, DCT8 or DST7 may be selected and used in a transform block. Alternatively, a different transform core may be used in transform in a horizontal direction and in transform in a vertical direction for a transform block.

A unit of a block performing first transform and second transform may be differently set. Concretely, for example, after first transform is performed in a 8×8 block of a residual image, second transform may be performed respectively per 4×4 sub-block. In another example, after first transform is performed in each 4×4 block, second transform may be performed respectively in a 8×8 sized block.

A residual image to which first transform is applied is referred to as a first transform residual image.

DCT or DST or two-dimensional image transform may be applied to a first transform residual image and transform used in this case is referred to as second transform. A two-dimensional image to which second transform is applied is referred to as a second transform residual image.

A sample value in a block after performing first transform and/or second transform is referred to as a transform coefficient. Quantization refers to a process in which a transform coefficient is divided by a predefined value to reduce energy of a block. A value defined to apply quantization to a transform coefficient is referred to as a quantization parameter.

A predefined quantization parameter may be applied in a unit of a sequence or a block. Generally, a quantization parameter may be defined as a value from 1 to 51.

After performing transform and quantization, a residual reconstructed image may be generated by performing dequantization and inverse transform. A first reconstructed image may be generated by adding a prediction image to a residual reconstructed image.

A transform block may be generated based on at least one of n transform types which are predefined in an encoding/decoding device. n may be an integer such as 1, 2, 3, 4, or more. The transform type such as DCT2, DCT8, DST7, a transform skip mode, etc. may be used. Only one same transform type may be applied in a vertical/horizontal direction of one block or a different transform type may be applied in a vertical/horizontal direction, respectively. For this, a flag representing whether one same transform type is applied may be used. The flag may be signaled from an encoding device.

In addition, the transform type may be determined based on information signaled from an encoding device or may be determined based on a predetermined encoding parameter. In this case, an encoding parameter may mean at least one of a size, a shape, an intra prediction mode, or a component type (e.g., luma, chroma) relating to a block. A size of a block may be represented as a width, a height, a ratio of a width and a height, a multiplication of a width and a height, a sum/a difference of a width and a height, etc. For example, when a size of a current block is greater than a predetermined threshold value, a transform type in a horizontal direction may be determined as a first transform type (e.g., DCT2) and a transform type in a vertical direction may be determined as a second transform type (e.g., DST7). The threshold value may be an integer such as 0, 4, 8, 16, 32, or more.

On the other hand, a residual coefficient according to the present disclosure may be obtained by performing second transform after first transform. Second transform may be performed for a residual coefficient of some regions in a current block. In this case, a decoding device may obtain a transform block of a current block by performing second inverse transform for the some regions and performing first inverse transform for a current block including the inversely-transformed regions.

Figure 29:
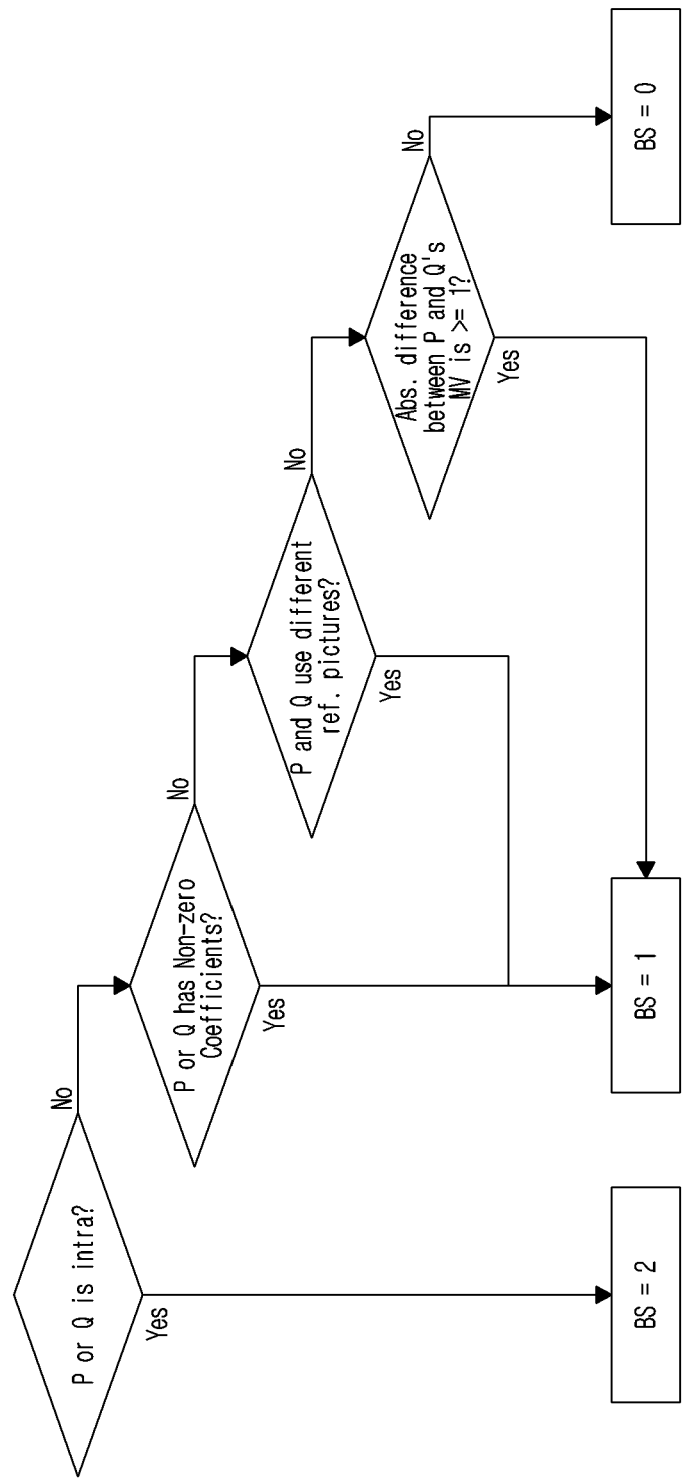
FIGS. 29 and 30 show a method in which an in-loop filter is applied to a reconstructed block as an embodiment to which the present disclosure is applied.
Figure 30:
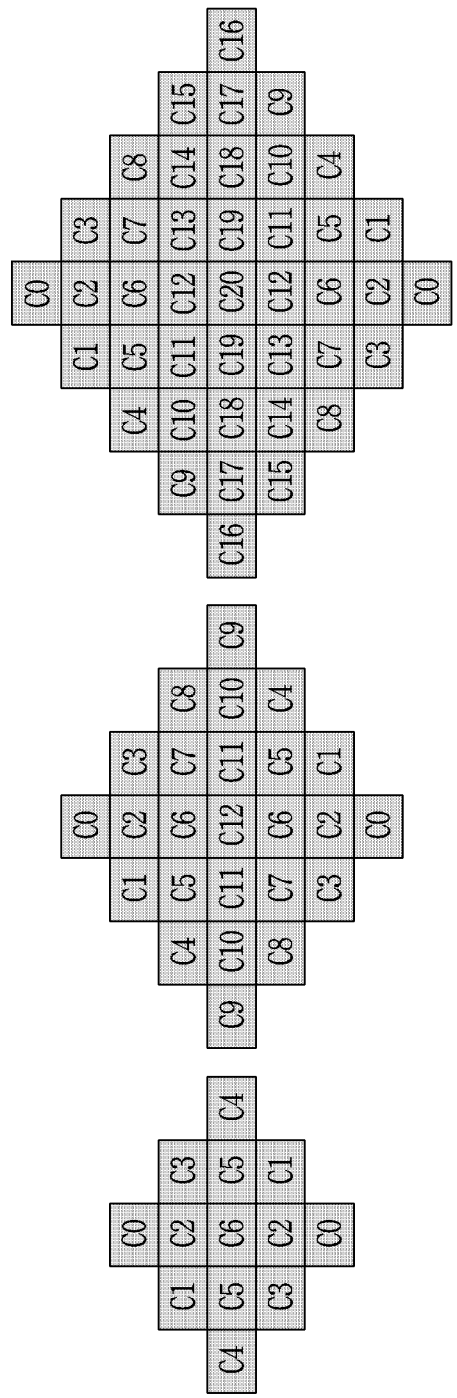

FIGS. 29 and 30 show a method in which an in-loop filter is applied to a reconstructed block as an embodiment to which the present disclosure is applied.

A predetermined in-loop filter may be applied to a reconstructed current block. An in-loop filter may include at least one of a deblocking filter, a SAO (sample adaptive offset) filter or an ALF (adaptive loop filter).

In-loop filtering is a technology which adaptively performs filtering for a decoded image to reduce loss of information generated in a process of quantization and encoding. A deblocking filter, a sample adaptive offset filter (SAO) and an adaptive loop filter (ALF) are an example of in-loop filtering.

A second reconstructed image may be generated by performing at least any one of a deblocking filter, a sample adaptive offset filter (SAO) or an adaptive loop filter (ALF) for a first reconstructed image.

After applying a deblocking filter to a reconstructed image, SAO and ALF may be applied.

Transform and quantization are performed in a unit of a block in a video encoding process. Loss generated in a quantization process is generated and discontinuity is generated on a boundary of an image reconstructing it. A discontinuous image generated on a block boundary is referred to as blocking artifact.

A deblocking filter is a method which alleviates blocking artifact generated on a block boundary of a first image and improves encoding performance.

Blocking artifact may be alleviated by performing filtering on a block boundary and a value of a blocking strength (hereinafter, BS) may be determined based on at least any one of whether a block is encoded by an intra prediction mode as in FIG. 29, or whether a difference of an absolute value of a motion vector of a neighboring block is greater than a predefined predetermined threshold value, or whether a reference picture of a neighboring block is the same each other. When a value of BS is 0, filtering may not be performed and when a value of BS is 1 or 2, filtering may be performed on a block boundary.

Because quantization is performed in a frequency domain, ringing artifact is generated on an edge of an object or a pixel value gets larger or smaller by a certain value compared to an original. SAO may effectively reduce ringing artifact by adding or subtracting a specific offset in a unit of a block by considering a pattern of a first reconstructed image. SAO is configured with an edge offset (hereinafter, EO) and a band offset (BO) according to a feature of a reconstructed image. An edge offset is a method which differently adds an offset to a current sample according to a surrounding pixel sample pattern. A band offset is to reduce an encoding error by adding a certain value to a pixel set with a similar pixel brightness value in a region. Pixel brightness may be divided into 32 uniform bands to set a pixel with a similar brightness value as one set. For example, 4 adjacent bands may be combined into one category. It may be set to use the same offset value in one category.

ALF (Adaptive Loop Filter) is a method which generates a second reconstructed image by using any one of predefined filters for a first reconstructed image or a reconstructed image resulting from performing the deblocking filtering on a first reconstructed image as in Equation 14.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l) \quad \text{[Equation 14]}$$

In this case, a filter may be selected in a unit of a picture or in a unit of a CTU.

For a luma component, any one of a 5×5, 7×7 or 9×9 diamond shape may be selected as in the following FIG. 30. For a chroma component, there may be a limit that only a 5×5 diamond shape is used.

A variety of embodiments of the present disclosure do not enumerate all possible combinations, but are to describe the representative aspect of the present disclosure and matters described in various embodiments may be independently applied or may be applied by two or more combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software or instructions, etc. are stored and are executable in a device or a computer.

INDUSTRIAL APPLICABILITY

The present disclosure may be used for encoding/decoding a video.

What is claimed is:

1. A decoding method of an image, the method comprising:
deriving motion information of a current block based on a merge index and a merge candidate list of the current block, wherein the motion information includes at least one of a motion vector or a reference picture index, and wherein the merge candidate list includes at least one merge candidate; and performing inter prediction of the current block based on the motion information of the current block, wherein a maximum number of merge candidates available for the current block is adaptively determined based on a first flag indicating whether to use a motion vector difference value for inter prediction of the current block, wherein the motion vector of the current block is modified with the motion vector difference value based on the first flag indicating that the motion vector difference value is used for the inter prediction of the current block, wherein the motion vector difference value is derived based on a merge offset vector, wherein the merge offset vector is determined based on a length candidate and a direction candidate, wherein the length candidate is determined based on a first index specifying one of a plurality of length candidates, and the direction candidate is determined based on a second index specifying one of a plurality of direction candidates, wherein a range of the length candidates is determined differently based on a second flag indicating whether only integer sample precision is used, and wherein the second flag equal to a first value indicates that only the integer sample precision is used, and the second flag equal to a second value indicates that either fractional or integer sample precision is used.

2. The method of claim 1, wherein the merge candidate list includes at least one of a spatial merge candidate or a temporal merge candidate of the current block, wherein motion information of a previous block belonging to a motion information list of the current block is added to the merge candidate list, and wherein the previous block is one or more blocks which are decoded before the current block.

3. The method of claim 1, wherein the direction candidates include a left, right, top and bottom direction.

4. The method of claim 1, wherein the motion vector difference value is derived by applying a predetermined scaling factor to the merge offset vector, and wherein the scaling factor is determined based on a POC difference between a current picture to which the current block belongs and a reference picture of the current block.

5. An encoding method of an image, the method comprising:

determining motion information of a current block based on a merge candidate list, wherein the motion information includes at least one of a motion vector or a reference picture index, wherein a merge index for specifying the motion information of the current block is encoded into a bitstream, and wherein the merge candidate list includes at least one merge candidate; and performing inter prediction of the current block based on the motion information of the current block, wherein a maximum number of merge candidates available for the current block is adaptively determined based on whether to use a motion vector difference value for inter prediction of the current block, wherein the motion vector of the current block is modified with the motion vector difference value based on a determination that the motion vector difference value is used for the inter prediction of the current block, wherein the motion vector difference value is determined based on a merge offset vector, wherein the merge offset vector is determined based on a length candidate and a direction candidate, wherein a first index specifying the length candidate among a plurality of length candidates and a second index specifying the direction candidate among a plurality of direction candidates are encoded into the bitstream, wherein a range of the length candidates is determined differently based on a flag indicating whether only integer sample precision is used, and wherein the flag equal to a first value indicates that only the integer sample precision is used, and the flag equal to a second value indicates that either fractional or integer sample precision is used.

6. A method of transmitting a bitstream, the method comprising:

generating the bitstream based on determining motion information of a current block based on a merge candidate list, wherein the motion information includes at least one of a motion vector or a reference picture index, wherein a merge index for specifying the motion information of the current block is encoded into the bitstream, and wherein the merge candidate list includes at least one merge candidate;

performing inter prediction of the current block based on the motion information of the current block; and transmitting the bitstream, wherein a maximum number of merge candidates available for the current block is adaptively determined based on whether to use a motion vector difference value for inter prediction of the current block, wherein the motion vector of the current block is modified with the motion vector difference value based on a determination that the motion vector difference value is used for the inter prediction of the current block, wherein the motion vector difference value is determined based on a merge offset vector, wherein the merge offset vector is determined based on a length candidate and a direction candidate, wherein a first index specifying the length candidate among a plurality of length candidates and a second index specifying the direction candidate among a plurality of direction candidates are encoded into the bitstream, wherein a range of the length candidates is determined differently based on a flag indicating whether only integer sample precision is used, and wherein the flag equal to a first value indicates that only the integer sample precision is used, and the flag equal to a second value indicates that either fractional or integer sample precision is used.

* * * * *